US010558827B2

(12) United States Patent
Faulkner et al.

(10) Patent No.: US 10,558,827 B2
(45) Date of Patent: Feb. 11, 2020

(54) AUTOMATIC METHOD AND SYSTEM FOR IDENTIFYING CONSENSUS AND RESOURCES

(71) Applicant: MICROSOFT TECHNOLOGY LICENSING, LLC, Redmond, WA (US)

(72) Inventors: Jason Thomas Faulkner, Seattle, WA (US); Casey James Baker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 15/904,238

(22) Filed: Feb. 23, 2018

(65) Prior Publication Data

US 2019/0266238 A1 Aug. 29, 2019

(51) Int. Cl.
*G06F 17/27* (2006.01)
*H04L 29/06* (2006.01)
(Continued)

(52) U.S. Cl.
CPC .............. *G06F 40/35* (2020.01); *G06F 16/35* (2019.01); *G06F 16/783* (2019.01); *G10L 15/1822* (2013.01); *H04L 12/1813* (2013.01); *H04L 65/403* (2013.01); *G06K 9/00335* (2013.01); *G06K 9/00711* (2013.01)

(58) Field of Classification Search
CPC . H04L 67/306; H04L 12/1831; H04L 65/403; G06F 16/9535; G06F 16/951; G06F 17/279; G06F 16/35; G10L 15/26; G10L 15/1815; G06K 9/00288; G06K 9/00281; G06K 9/6267
See application file for complete search history.

(56) References Cited

U.S. PATENT DOCUMENTS 9,317,574 B1 * 4/2016 Brisebois ................ G06F 21/62
9,332,221 B1 * 5/2016 Breedvelt-Schouten ....................
H04N 7/15
(Continued)

FOREIGN PATENT DOCUMENTS

WO 0153922 A2 7/2001
WO 2017035136 A1 3/2017

OTHER PUBLICATIONS

"International Search Report and Written Opinion Issued in PCT Application No. PCT/US19/017735", dated Apr. 4, 2019, 13 Pages.
(Continued)

Primary Examiner — Yogeshkumar Patel
(74) Attorney, Agent, or Firm — Newport IP, LLC; Tim R. Wyckoff

(57) ABSTRACT

Implementations may provide contextually-aware expertise or decision-making assistance for meeting participants. A system may include a computerized or automated assistant to help participants of a communication session to identify individuals having expertise related to a topic discussed during the communication session. The system, through the use of an agent-assisted response intelligence observing the communication session, may identify that meeting participants require assistance or expertise on a discussed topic. The agent-assisted response intelligence may reach out to individuals to ascertain if they have the expertise related to the discussed topic.

24 Claims, 9 Drawing Sheets

(51) Int. Cl.
  *G10L 15/18* (2013.01)
  *G06F 16/35* (2019.01)
  *G06F 16/783* (2019.01)
  *H04L 12/18* (2006.01)
  *G06K 9/00* (2006.01)
  *G06F 40/35* (2020.01)

(56) References Cited

U.S. PATENT DOCUMENTS

| | | |
|---|---|---|
| 2002/0133550 A1 | 9/2002 | Mears et al. |
| 2007/0005698 A1* | 1/2007 | Kumar .................. G06Q 10/10 709/204 |
| 2008/0320084 A1 | 12/2008 | Godon et al. |
| 2015/0120680 A1 | 4/2015 | Alonso et al. |
| 2015/0350258 A1 | 12/2015 | Griffin et al. |
| 2016/0378081 A1 | 12/2016 | Della corte et al. |
| 2017/0063745 A1 | 3/2017 | Banerjee et al. |
| 2017/0076205 A1 | 3/2017 | Arora et al. |
| 2017/0134316 A1 | 5/2017 | Cohen et al. |
| 2017/0214954 A1 | 7/2017 | Trollope et al. |
| 2017/0366854 A1 | 12/2017 | Puntambekar et al. |
| 2019/0268385 A1 | 8/2019 | Faulkner et al. |

OTHER PUBLICATIONS

"International Search Report and Written Opinion Issued in PCT Application No. PCT/US2019/017911", dated Apr. 4, 2019, 13 Pages.

"Non Final Office Action Issued in U.S. Appl. No. 15/904,221", dated May 31, 2019, 22 Pages.

"Non Final Office Action Issued in U.S. Appl. No. 15/904,221", dated Nov. 1, 2019, 29 Pages.

* cited by examiner

AUTOMATIC METHOD AND SYSTEM FOR IDENTIFYING CONSENSUS AND RESOURCES

BACKGROUND

The use of communication (e.g., conference, videoconference, teleconference, etc.) systems in personal and commercial settings has increased dramatically so that meetings between people in remote locations can be facilitated. In general, communication systems allow users, in remote locations, to communicate interactively with each other via live or recorded, simultaneous two-way video streams, audio streams, or both. Some communication systems (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE FOR BUSINESS provided by the MICROSOFT CORPORATION, of Redmond, Wash.) also allow users to share display screens that present, for example, images, text, video, applications, and any other content items that are rendered on the display screen(s) the user is sharing.

State-of-the-art communication systems may provide dedicated cameras and monitors to one or two or more individuals, simulating innovative room arrangements to make the remote participants feel like they are in the same room together at a single location by placing monitors and speakers at locations where a remote meeting participant would be sitting, if they were attending in person.

A networked meeting represents one popular form of electronic collaboration that facilitates communication between two or more participants present at separate physical locations. Participants of a communication session in a networked meeting are able to exchange live video, audio, and other data to view, hear, and otherwise share information. Participants can also view a common space, e.g., a whiteboard or a shared application, through which ideas can be exchanged. Viewing of the common space can be complemented with a video and audio conference, an instant messaging session, or any combination thereof, such that the networked meeting can act as a near substitute for an in-person meeting.

Information exchanged and discussed during a networked meeting may be automatically or manually recorded for review or analysis at some later time. For example, it may be beneficial to review or analyze a live or recorded networked meeting to ascertain conclusions, consensus, or disagreements on various topics that arose during the meeting. Furthermore, it may also be beneficial to review or analyze a live or recorded networked meeting to determine if participants require assistance or expertise on various topics that arose during the meeting.

However, from time to time, it may be difficult for participants to come to a consensus on various topics presented during a meeting. To make joint decisions, participants are often required to perform a number of manual tasks, e.g., gather supplemental information, make phone calls, send additional emails, communicate with teammates who may not be in attendance, etc., while the meeting is ongoing. Such tasks may lead to unwanted delay or missed opportunities, particularly when time-sensitive scenarios are presented. Furthermore, scenarios may arise in which participants in a meeting express the need to seek assistance or expertise on various topics that arose during the meeting. Such issues are exacerbated when individuals have to make group decisions afterward based on a recording of a meeting that took place previously. For example, the review or analysis of a recorded meeting may consume considerable time.

SUMMARY

The techniques disclosed herein provide contextually-aware consensus assistance for meeting participants and for those viewing a recorded meeting. A system can help a team come to an accurate consensus about decisions to be made and enhance accuracy of decision making even when team members and decision makers are not present in a meeting. The accuracy of a decision can be improved by reaching out to relevant team members and/or decision makers who may be absent for the meeting, e.g., colleagues, teammates, etc. More importantly, a meeting and a decision process can proceed even when a meeting does not meet the requirements of a quorum. For example, if ten people are required to make a decision, and only seven show up at a meeting, the meeting can still move forward, and voting can still be conducted afterward using the techniques disclosed herein. This can be helpful when the absent team members are in different time zones.

In some configurations, agent-assisted response intelligence can be used to analyze the data of a meeting to identify a topic(s) requiring consensus of the participants, both present at the meeting and not present but reviewing recorded meetings afterward. The meeting data may include audio data, video data, shared files, and other forms of shared media. The data may be analyzed by the agent, which may include the analysis of gestures or voice input provided by each participant present at the meeting.

Poll data indicating a query can automatically be generated and communicated to the appropriate channels in real time or subsequently to locate teammates or other individuals or decision makers who are associated with the meeting topic but which are not in attendance or did not attend the meeting. The agent provides the relevant individuals with survey information or polling information designed to elicit participant response by increasing understanding/knowledge of the topic so as to achieve group consensus related to a topic subsequent to a meeting or active communication session. Also, to enhance contextually aware expertise of participants, the agent may also subsequently provide the survey information or polling information across multiple communication platforms, such as user interactive chat channels, linked to the meeting or communication session. Therefore, the agent collected information and data may reach beyond the active communication session to stimulate or enhance user collaboration across multiple communication platforms.

The techniques disclosed herein may further provide contextually-aware expertise or decision-making assistance for meeting participants. A system can help participants of the communication session identify individuals having expertise related to a topic discussed during the communication session. In some configurations, the assistance may be provided by agent-assisted response intelligence observing the communication session.

The agent-assisted response intelligence may reach out to individuals that may be able to assist the meeting participants. For example, the agent-assisted response intelligence may search databases to identify individuals not present at the meeting with expertise that relates to a discussed meeting topic. The agent-assisted response intelligence may then generate a query in the form of a poll or survey that is communicated to the identified individuals. The agent-assisted response intelligence may collect responses from the identified individuals. The collected responses may be presented to one or more of the participants which may assist one or more of the meeting participants to identify individuals having expertise that relates to the discussed topic.

In some configurations, agent-assisted response intelligence can further be used to analyze the data of a meeting to identify that participants of the meeting are seeking assistance or expertise related to a discussed topic. The meeting data may include audio data, video data, shared files, and other forms of shared media. The data may be analyzed by the agent, which may include the analysis of gestures or voice input provided by each participant.

Poll data indicating a query can automatically be generated and communicated to appropriate channels to locate one or more individuals having expertise related to a topic discussed during the meeting. The agent provides the one or more individuals having the expertise with polling information that elicits a response related to the topic discussed during the meeting. The agent may also provide the survey information or polling information to platforms, such as user interactive chat channels, linked to the communication session. Therefore, the agent collected information and data may reach beyond the active communication session to identify individuals having expertise related to the topic discussed during the meeting.

In some implementations, a computer implemented method may collect, by one or more data processing devices connected to a communication session via a data transmission network, data shared between participants during the communication session, the data shared via the one or more data processing devices, the shared data indicating the participants are seeking information on a topic covered in the communication session. The method may generate a query based on the topic covered in the communication session, the query configured to invoke a recipient of the query to provide a response, and identify one or more individuals, different from the participants, having knowledge that may be related to the topic covered in the communication session. Furthermore, the method may transmit the generated query to data processing devices associated with the identified one or more individuals having knowledge that may be related to the topic covered in the communication session, and receive, via the data transmission network, responses to the query from the data processing devices associated with the identified one or more individuals having knowledge that may be related to the topic covered in the communication session. Furthermore, the method may compile a result based on the received responses, and cause display of a graphical user interface comprising the result.

In some implementations, a computer implemented method may collect, by one or more data processing devices connected to a communication session via a data transmission network, data shared between participants present during the communication session, the data shared via the one or more data processing devices, the shared data indicating the participants are seeking consensus on a topic covered in the communication session. The method may further generate a query based on the topic covered in the communication session, the query configured to invoke a recipient of the query to provide a response, and identify one or more individuals, different from the participants, having a linked association with at least one participant of the communication session. The method may transmit the generated query to data processing devices associated the participants and to data processing devices associated with the identified one or more individuals of an external communication session, and receive, via the data transmission network, responses to the query from the data processing devices associated with the participants and the identified one or more individuals. Furthermore, the method may compile a result based on the received responses, and cause display of a graphical user interface comprising the result.

In some implementations, a system is provided that includes one or more data processing devices, and a computer-readable medium having encoded thereon computer-executable instructions. The instructions may cause the one or more data processing devices to collect, by the one or more data processing devices connected to a communication session via a data transmission network, data shared between participants during the communication session, the data shared via the one or more data processing devices, the shared data indicating the participants are seeking consensus on a topic covered in the communication session. Furthermore, the instructions may further cause the one or more data processing devices to generate a query based on the topic covered in the communication session, the query configured to invoke a recipient of the query to provide a response, and identify one or more individuals, different from the participants, having a linked association with at least one participant of the communication session. In some implementations, the instructions may cause the one or more data processing devices to transmit the generated query to data processing devices associated the meeting participants and to data processing devices associated with the identified one or more individuals of an external communication session, and receive, via the data transmission network, responses to the query from the data processing devices associated with the participants and the identified one or more individuals. Furthermore, the instructions may compile a result based on the received responses, and cause display of a graphical user interface comprising the result.

In various implementations, a system may include means to collect, via a communication session associated with a data transmission network, data shared between participants during the communication session, the shared data indicating the participants are seeking information on a topic covered in the communication session, and means to generate a query based on the topic covered in the communication session, the query configured to invoke a recipient of the query to provide a response. Furthermore, the system may provide means to identify one or more individuals, different from the participants, having knowledge that may be related to the topic covered in the communication session, and means to transmit the generated query to data processing devices associated with the identified one or more individuals having knowledge that may be related to the topic covered in the communication session. In some implementations, the system provides means to receive, via the data transmission network, responses to the query from the data processing devices associated with the identified one or more individuals having knowledge that may be related to the topic covered in the communication session. Furthermore, the system may provide means to compile a result based on the received responses, and means to cause display of a graphical user interface comprising the result.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
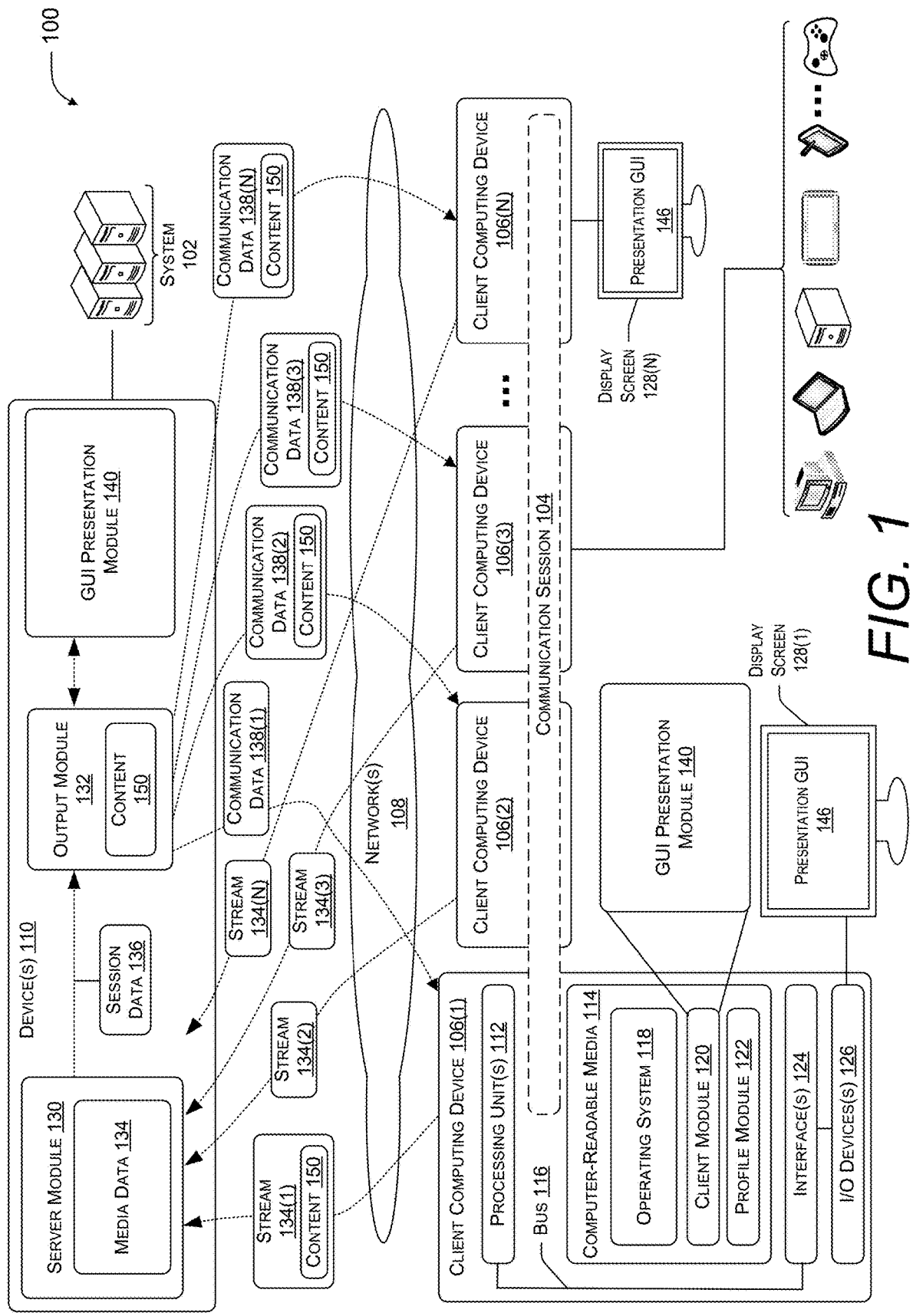
FIG. 1 is a diagram illustrating an example environment in which a system can operate to populate a graphical user interface (GUI) with video content, image content and/or presentation content.

Various techniques disclosed herein provide contextually-aware consensus assistance for meeting participants and for those viewing a recorded meeting. A system can help a team come to an accurate consensus about decisions to be made and enhance accuracy of decision making even when team members and decision makers are not present in a meeting. The accuracy of a decision can be improved by reaching out to relevant team members and/or decision makers who may be absent for the meeting, e.g., colleagues, teammates, etc. More importantly, a meeting and a decision process can proceed even when a meeting does not meet the requirements of a quorum. For example, if ten people are required to make a decision, and only seven show up at a meeting, the meeting can still move forward, and voting can still be conducted afterward using the techniques disclosed herein. This can be helpful when the absent team members are in different time zones.

In some configurations, agent-assisted response intelligence can be used to analyze the data of a meeting to identify a topic(s) requiring consensus of the participants, both present at the meeting and not present but reviewing recorded meetings afterward. The meeting data may include audio data, video data, shared files, and other forms of shared media. The data may be analyzed by the agent, which may include the analysis of gestures or voice input provided by each participant present at the meeting.

Poll data indicating a query can automatically be generated and communicated to the appropriate channels in real time or subsequently to locate teammates or other individuals or decision makers who are associated with the meeting topic but which are not in attendance or did not attend the meeting. The agent provides the relevant individuals with survey information or polling information designed to elicit participant response by increasing understanding/knowledge of the topic so as to achieve group consensus related to a topic subsequent to a meeting or active communication session. Also, to enhance contextually aware expertise of participants, the agent may also subsequently provide the survey information or polling information across multiple communication platforms, such as user interactive chat channels, linked to the meeting or communication session. Therefore, the agent collected information and data may reach beyond the active communication session to stimulate or enhance user collaboration across multiple communication platforms.

The techniques disclosed herein may further provide contextually-aware expertise or decision-making assistance for meeting participants. A system can help participants of the communication session identify individuals having expertise related to a topic discussed during the communication session. In some configurations, the assistance may be provided by agent-assisted response intelligence observing the communication session.

The agent-assisted response intelligence may reach out to individuals that may be able to assist the meeting participants. For example, the agent-assisted response intelligence may search databases to identify individuals not present at the meeting with expertise that relates to a discussed meeting topic. The agent-assisted response intelligence may then generate a query in the form of a poll or survey that is communicated to the identified individuals. The agent-assisted response intelligence may collect responses from the identified individuals. The collected responses may be presented to one or more of the participants which may assist one or more of the meeting participants to identify individuals having expertise that relates to the discussed topic.

In some configurations, agent-assisted response intelligence can further be used to analyze the data of a completed meeting to identify that participants of the meeting are seeking assistance or expertise related to a discussed topic. The meeting data may include audio data, video data, shared files, and other forms of shared media. The data may be analyzed by the agent, which may include the analysis of gestures or voice input provided by each participant.

Poll data indicating a query can automatically be generated and communicated to appropriate channels to locate one or more individuals having expertise related to a topic that was discussed during the meeting. The agent provides the one or more individuals having the expertise with polling information that elicits a response related to the topic discussed during the meeting. The agent may also provide the survey information or polling information to platforms, such as user interactive chat channels, linked to the communication session. Therefore, the agent collected information and data may reach beyond the active communication session to identify individuals having expertise related to the topic discussed during the meeting.

In some implementations, a computer implemented method may collect, by one or more data processing devices connected to a communication session via a data transmission network, data shared between participants during the communication session, the data shared via the one or more data processing devices, the shared data indicating the participants are seeking information on a topic covered in the communication session. The method may generate a query based on the topic covered in the communication session, the query configured to invoke a recipient of the query to provide a response, and identify one or more individuals, different from the participants, having knowledge that may be related to the topic covered in the communication session. Furthermore, the method may transmit the generated query to data processing devices associated with the identified one or more individuals having knowledge that may be related to the topic covered in the communication session, and receive, via the data transmission network, responses to the query from the data processing devices associated with the identified one or more individuals having knowledge that may be related to the topic covered in the communication session. Furthermore, the method may compile a result based on the received responses, cause display of a graphical user interface comprising the result.

In some implementations, a computer implemented method may collect, by one or more data processing devices connected to a communication session via a data transmission network, data shared between participants during the communication session, the data shared via the one or more data processing devices, the shared data indicating the participants are seeking consensus on a topic covered in the communication session. The method may further generate a query based on the topic covered in the communication session, the query configured to invoke a recipient of the query to provide a response, and identify one or more individuals, different from the participants, having a linked association with at least one participant of the communication session. The method may transmit the generated query to data processing devices associated with the participants and to data processing devices associated with the identified one or more individuals of an external communication session, and receive, via the data transmission network, responses to the query from the data processing devices associated with the participants and the identified one or more individuals. Furthermore, the method may compile a result based on the received responses, and cause display of a graphical user interface comprising the result.

In some implementations, a system is provided that includes one or more data processing devices, and a computer-readable medium having encoded thereon computer-executable instructions. The instructions may cause the one or more data processing devices to collect, by the one or more data processing devices connected to a communication session via a data transmission network, data shared between participants during the communication session, the data shared via the one or more data processing devices, the shared data indicating the participants are seeking consensus on a topic covered in the communication session. Furthermore, the instructions may further cause the one or more data processing devices to generate a query based on the topic covered in the communication session, the query configured to invoke a recipient of the query to provide a response, and identify one or more individuals, different from the participants, having a linked association with at least one participant of the communication session. In some implementations, the instructions may cause the one or more data processing devices to transmit the generated query to data processing devices associated with the participants and to data processing devices associated with the identified one or more individuals of an external communication session, and receive, via the data transmission network, responses to the query from the data processing devices associated with the participants and the identified one or more individuals. Furthermore, the instructions may compile a result based on the received responses, and cause display of a graphical user interface comprising the result.

In various implementations, a system may include means to collect, via a communication session associated with a data transmission network, data shared between participants during the communication session, the shared data indicating the participants are seeking information on a topic covered in the communication session, and means to generate a query based on the topic covered in the communication session, the query configured to invoke a recipient of the query to provide a response. Furthermore, the system may provide means to identify one or more individuals, different from the participants, having knowledge that may be related to the topic covered in the communication session, and means to transmit the generated query to data processing devices associated with the identified one or more individuals having knowledge that may be related to the topic covered in the communication session. In some implementations, the system provides means to receive, via the data transmission network, responses to the query from the data processing devices associated with the identified one or more individuals having knowledge that may be related to the topic covered in the communication session. Furthermore, the system may provide means to compile a result based on the received responses, and means to cause display of a graphical user interface comprising the result.

Various examples, implementations, scenarios, and aspects are described below with reference to FIGS. 1 through 9.

FIG. 1 is a diagram illustrating an example environment 100 in which a system 102 can operate to populate a graphical user interface (GUI) with video content, image content and/or presentation content. In some implementations, a system implemented agent may function to collect and/or analyze data associated with the example environment 100. For example, the agent may function to collect and/or analyze data exchanged between participants involved in a communication session 104 linked to the GUI.

As illustrated, the communication session 104 may be implemented between a number of client computing devices 106(1) through 106(N) (where N is a positive integer number having a value of two or greater) that are associated with the system 102 or are part of the system 102. The client computing devices 106(1) through 106(N) enable users, also referred to as individuals, to participate in the communication session 104.

In this example, the communication session 104 is hosted, over one or more network(s) 108, by the system 102. That is, the system 102 can provide a service that enables users of the client computing devices 106(1) through 106(N) to participate in the communication session 104 (e.g., via a live viewing and/or a recorded viewing). Consequently, a "participant" to the communication session 104 can comprise a user and/or a client computing device (e.g., multiple users may be in a communication room participating in a communication session via the use of a single client computing device), each of which can communicate with other participants. As an alternative, the communication session 104 can be hosted by one of the client computing devices 106(1) through 106(N) utilizing peer-to-peer technologies. The system 102 can also host chat conversations and other team collaboration functionality (e.g., as part of an application suite). In some implementations, such chat conversations and other team collaboration functionality are considered external communication sessions distinct from the communication session 104. A computerized agent to collect participant data in the communication session 104 may be able to link to such external communication sessions. Therefore, the computerized agent may receive information, such as date, time, session particulars, and the like, that enables connectivity to such external communication sessions. In one example, a chat conversation can be conducted in accordance with the communication session 104. Additionally, the system 102 may host the communication session 104, which includes at least a plurality of participants co-located at a meeting location, such as a meeting room or auditorium.

In examples described herein, client computing devices 106(1) through 106(N) participating in the communication session 104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 104 live as activity occurs, or alternatively, via a recording at a later time after the activity occurs. In examples described herein, client computing devices 106(1) through 106(N) participating in the communication session 104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more communication sessions such as communication session 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device or a server-type device, device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more data processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by data processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, client computing device(s) 106(1) through 106(N) can include input/output ("I/O") interfaces 126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 1 illustrates that client computing device 106(1) is in some way connected to a display device (e.g., a display screen 128(1)), which can display a GUI according to the techniques described herein.

In the example environment 100 of FIG. 1, client computing devices 106(1) through 106(N) may use their respective client modules 120 to connect with one another and/or other external device(s) in order to participate in the communication session 104, or in order to contribute activity to a collaboration environment. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network(s) 108.

The client computing device(s) 106(1) through 106(N) may use their respective profile module 122 to generate participant profiles (not shown in FIG. 1), and provide the participant profiles to other client computing devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 1, the device(s) 110 of the system 102 includes a server module 130 and an output module 132. In this example, the server module 130 is configured to receive, from individual client computing devices such as client computing devices 106(1) through 106(N), media streams 134(1) through 134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 130 is configured to receive a collection of various media streams 134(1) through 134(N) during a live viewing of the communication session 104 (the collection being referred to herein as media data 134). In some scenarios, not all the client computing devices that participate in the communication session 104 provide a media stream. For example, a client computing device may only be a consuming, or a "listening", device such that it only receives content associated with the communication session 104 but does not provide any content to the communication session 104.

In various examples, the server module 130 can select aspects of the media data 134 that are to be shared with individual ones of the participating client computing devices 106(1) through 106(N). Consequently, the server module 130 may be configured to generate session data 136 based on the streams 134 and/or pass the session data 136 to the output module 132. Then, the output module 132 may communicate communication data 138 to the client computing devices (e.g., client computing devices 106(1) through 106(3) participating in a live viewing of the communication session). The communication data 138 may include video, audio, and/or other content data, provided by the output module 132 based on content 150 associated with the output module 132 and based on received session data 136. As shown, the output module 132 transmits communication data 138(1) to client computing device 106(1), and transmits communication data 138(2) to client computing device 106(2), and transmits communication data 138(3) to client computing device 106(3), etc. The communication data 138 transmitted to the client computing devices can be the same or can be different (e.g., positioning of streams of content within a user interface may vary from one device to the next).

In various implementations, the device(s) 110 and/or the client module 120 can include GUI presentation module 140. The GUI presentation module 140 may be configured to analyze communication data 138 that is for delivery to one or more of the client computing devices 106. Specifically, the GUI presentation module 140, at the device 110 and/or the client computing device 106, may analyze communication data 138 to determine an appropriate manner for displaying video, image, and/or content on the display screen 128 of an associated client computing device 106. In some implementations, the GUI presentation module 140 may provide video, image, and/or content to a presentation GUI 146 rendered on the display screen 128 of the associated client computing device 106. The presentation GUI 146 may be caused to be rendered on the display screen 128 by the GUI presentation module 140. The presentation GUI 146 may include the video, image, and/or content analyzed by the GUI presentation module 140.

In some implementations, the presentation GUI 146 may include a plurality of sections or grids that may render or comprise video, image, and/or content for display on the display screen 128. For example, a first section of the presentation GUI 146 may include a video feed of a presenter or individual, a second section of the presentation GUI 146 may include a video feed of an individual consuming meeting information provided by the presenter or individual. The GUI presentation module 140 may populate the first and second sections of the presentation GUI 146 in a manner that properly imitates an environment experience that the presenter and the individual may be sharing. In some implementations, the GUI presentation module 140 may enlarge or provide a zoomed view of the individual represented by the video feed in order to highlight a reaction, such as a facial feature, the individual had to the presenter. In some implementations, the presentation GUI 146 may include a video feed of a plurality of participants associated with a meeting, such as a general communication session. In other implementations, the presentation GUI 146 may be associated with a channel, such as a chat channel, enterprise teams channel, or the like. Therefore, the presentation GUI 146 may be associated with an external communication session that is different than the general communication session.

Figure 2:
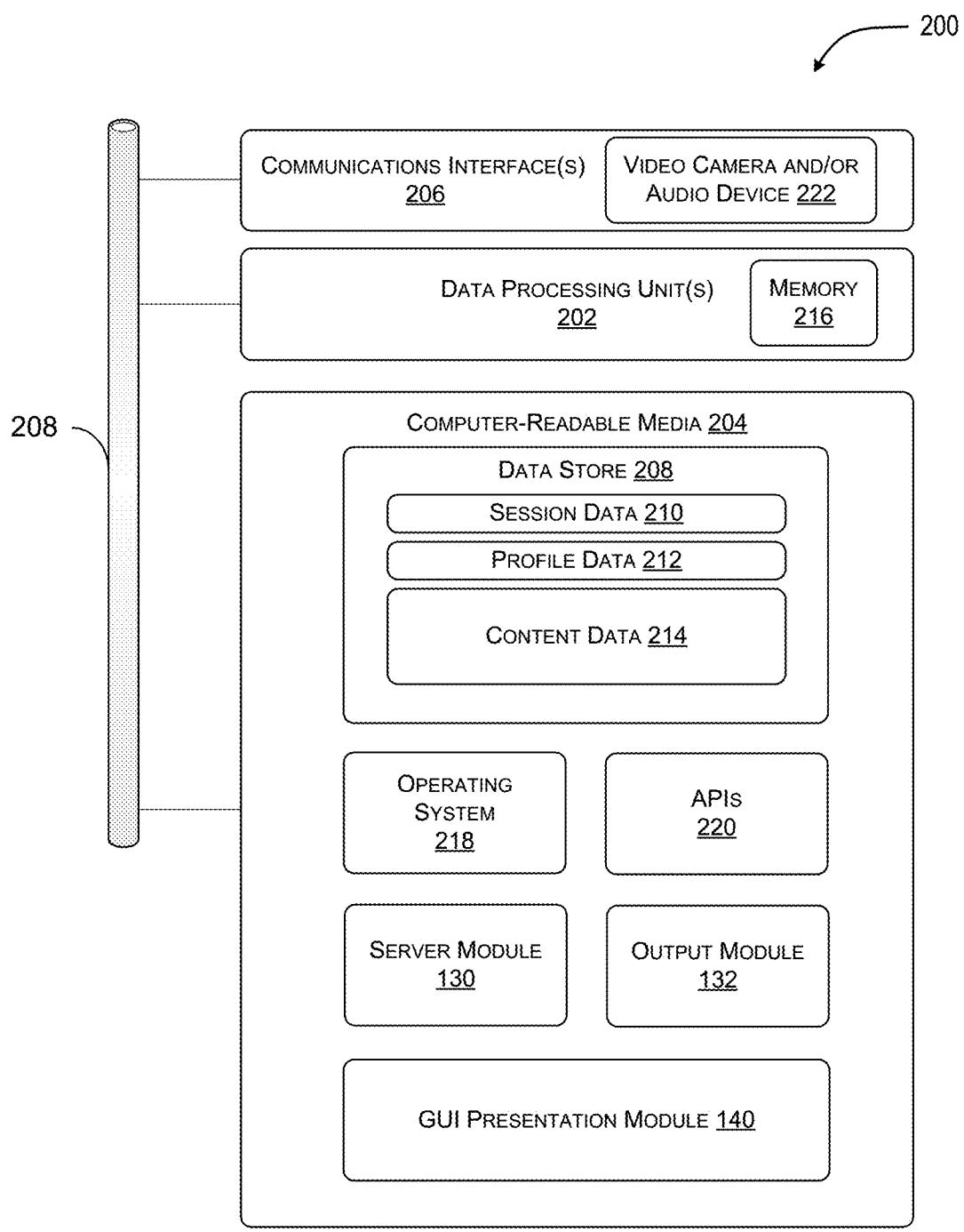
FIG. 2 illustrates a diagram that shows example components of an example device configured to populate the presentation GUI that may include one or more sections or grids that may render or comprise video, image, and/or content for display on the display screen.

FIG. 2 illustrates a diagram that shows example components of an example device 200 configured to populate the presentation GUI 146 that may include one or more sections or grids that may render or comprise video, image, and/or content for display on the display screen 128. The device 200 may represent one of device(s) 110. Additionally, or alternatively, the device 200 may represent one of the client computing devices 106. As illustrated, the device 200 includes one or more data processing unit(s) 202, computer-readable media 204, and communication interface(s) 206. The components of the device 200 are operatively connected, for example, via a bus, which may include one or more of a system bus, a data bus, an address bus, a PCI bus, a Mini-PCI bus, and any variety of local, peripheral, and/or independent buses.

The device 200 may represent one of device(s) 110. Additionally, or alternatively, the device 200 may represent one of the client computing devices 106. As illustrated, the device 200 includes one or more data processing unit(s) 202, computer-readable media 204, and communication interface(s) 206. The components of the device 200 are operatively connected, for example, via a bus, which may include one or more of a system bus, a data bus, an address bus, a PCI bus, a Mini-PCI bus, and any variety of local, peripheral, and/or independent buses.

As utilized herein, data processing unit(s), such as the data processing unit(s) 202 and/or data processing unit(s) 112, may represent, for example, a CPU-type data processing unit, a GPU-type data processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network. Furthermore, the communication interface(s) 206 may include one or more video cameras and/or audio devices 222 to enable generation of video feeds and/or still images, and so forth.

In the illustrated example, computer-readable media 204 includes a data store 208. In some examples, data store 208 includes data storage such as a database, data warehouse, or other type of structured or unstructured data storage. In some examples, data store 208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 208 may store data for the operations of processes, applications, components, and/or modules stored in computer-readable media 204 and/or executed by data processing unit(s) 202 and/or accelerator(s). For instance, in some examples, data store 208 may store session data 210 (e.g., session data 136), profile data 212 (e.g., associated with a participant profile), and/or other data. The session data 210 can include a total number of participants (e.g., users and/or client computing devices) in a communication session, activity that occurs in the communication session, a list of invitees to the communication session, and/or other data related to when and how the communication session is conducted or hosted. The data store 208 may also include content data 214, such as the content 150 that includes video, audio, or other content for rendering and display on one or more of the display screens 128.

Alternately, some or all of the above-referenced data can be stored on separate memories 216 on board one or more data processing unit(s) 202 such as a memory on board a CPU-type processor, a GPU-type processor, an FPGA-type accelerator, a DSP-type accelerator, and/or another accelerator. In this example, the computer-readable media 204 also includes operating system 218 and application programming interface(s) 220 configured to expose the functionality and the data of the device 200 to other devices. Additionally, the computer-readable media 204 includes one or more modules such as the server module 130, the output module 132, and the GUI presentation module 140, although the number of illustrated modules is just an example, and the number may vary higher or lower. That is, functionality described herein in association with the illustrated modules may be performed by a fewer number of modules or a larger number of modules on one device or spread across multiple devices.

Figure 3:
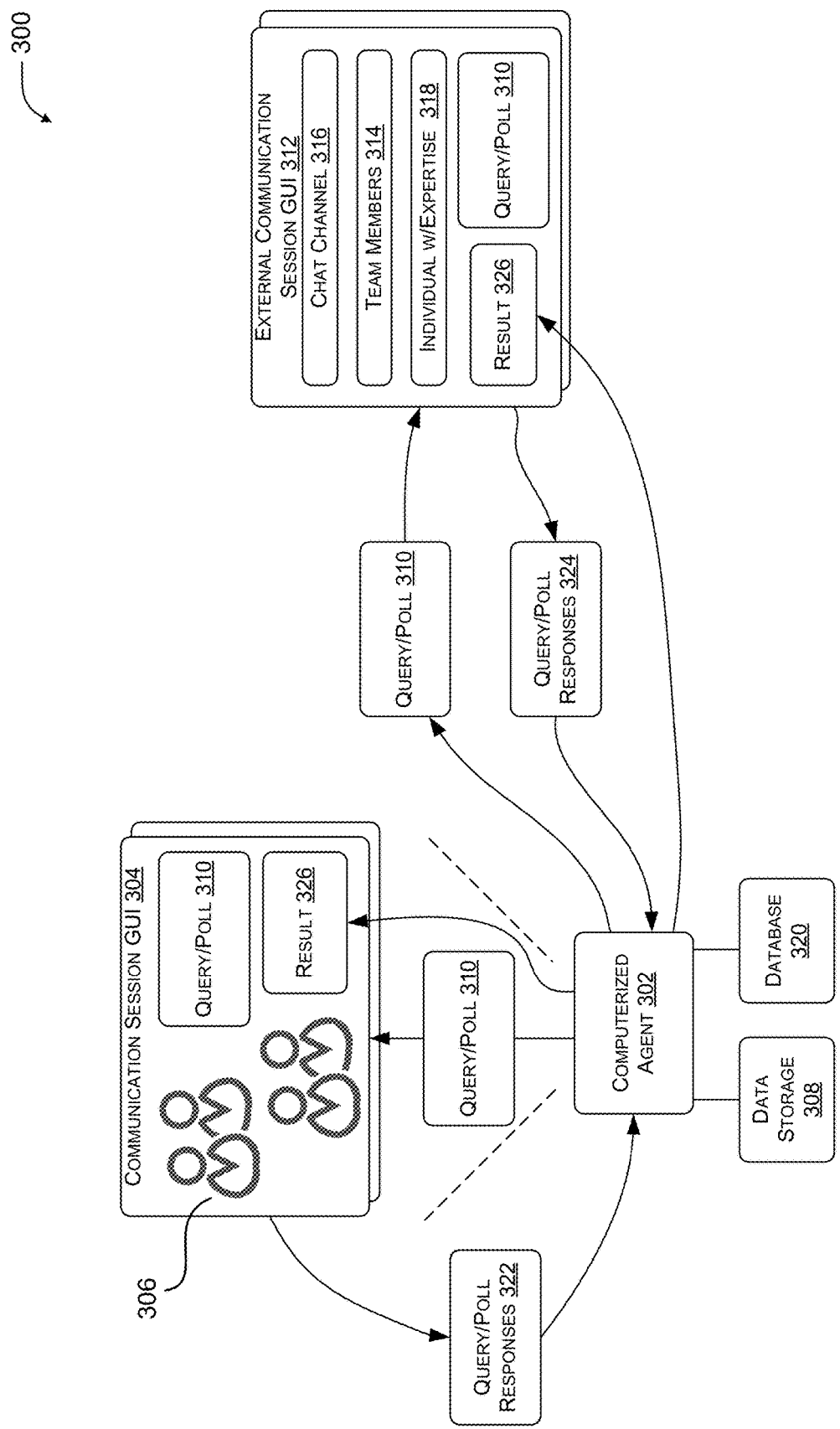
FIG. 3 illustrates an example environment in which a computerized agent or bot may operate to collect data shared between participants in a communication session.

FIG. 3 illustrates an example environment 300 in which a computerized agent or bot 302 may operate to collect data shared between participants in a communication session (e.g., the communication session 104). The communication session may be a meeting in which some participants are co-located at a meeting location. Alternatively, the communication session may be a meeting in which some participants are co-located and other participants are located at disparate locations. The communication session may be a live communication session or a recorded communication session. Furthermore, the described meetings and/or communication sessions include real-time, near real-time, asynchronous, and/or recorded communication sessions, etc., to include sessions provided by instant messaging systems and other collaboration systems, video and/or audio communication systems, meeting presentation systems, and the like. Additional details related to communication sessions are provided in the foregoing description.

The environment 300 may include a communication session GUI 304. The communication session GUI 304 may be an implementation of the described presentation GUI 146. The communication session GUI 304 may render a communication session that includes a plurality of participants 306. The communication session may be a real-time, near real-time, asynchronous, and/or recorded communication session provided by one or more systems, including but not limited to instant messaging systems and other collaboration systems, video and/or audio communication systems, meeting presentation systems, and the like. Additional details related to communication sessions are provided in the foregoing description.

The agent 302 may observe the communication session associated with the communication session GUI 304. In other implementations, the agent 302 may observe multiple communication sessions associated with multiple communication session GUIs 304. That is, the agent 302 may observe interactions between participants 306 that are co-located and/or participants 306 that are located at disparate locations and respectively associated with disparate communication session GUIs 304. The agent 302 may be directly or indirectly coupled to the communication session GUI 304. For example, the agent 302 may couple to the communication session GUI 304 via a user interactive conduit, such as Microsoft's Cortana. The communication session GUI 304 may be rendered on one or more data processing devices. In some implementations, the one or more data processing devices may be associated with one or more of the participants 306. For example, the communication session GUI 304 may be rendered on mobile phones, laptop computers, desktop computers, or other such computing devices.

The agent 302 may use voice or speech recognition technology, gesture recognition technology, and the like, to observe interactions associated with the plurality of participants 306. For example, the agent 302 may listen to discussions of the plurality of participants 306. Furthermore, the agent 302 may recognize gestures made by the plurality of participants 306. In some implementations, the agent 302 may listen to discussions of the participants 306 to ascertain if the participants 306 are seeking consensus on a discussed topic. Similarly, the agent 302 may analyze gestures made by the participants 306 to ascertain if the participants 306 are seeking consensus on a discussed topic. For example, the agent 302 may recognize from discussions and/or gestures by the participants 306 that a plurality of the participants 306 are attempting to identify consensus for an appropriate date and/or time for a follow-up meeting. In some implementations, the agent 302 may also recognize from discussions and/or gestures by the participants 306 that a plurality of the participants 306 are attempting to identify one or more individuals having expertise related to a topic discussed during the communication session. For example, the agent 302 may recognize from discussions and/or gestures by the participants 306 that one or more individuals having programming expertise, networking expertise, and the like, may be needed to assist in implementing a topic discussed during the communication session.

In some implementations, the agent 302 implements technology enabling the agent 302 to listen to voice and/or text conversations. For example, the agent 302 is able to parse voice and/or text conversations to ascertain that the participants 306 are seeking consensus related to a topic and/or one or more individuals having technical expertise related to a discussed topic. Furthermore, the agent 302 may implement a language interface. The language interface enables the agent 302 to process spoken and/or typed words, touchscreen interactions, gestures, intonations, and/or ontologies. Therefore, input to the language interface enables the agent 302 to identify a context of a discussion or conversation. This enables the agent 302 to estimate participants' 306 intent, perform an appropriate action, execute an action, and/or provide a result related to the agent action (e.g. generating a query 310/410). Furthermore, the agent 302 includes processing functionality enabling it to determine participant and/or individual intentions by way of multiple sources, such as speech and gesture recognition, user context, context from prior discussions, results obtained from one or more knowledge bases, and/or search engine use. The agent 302 may use some or all of these tools in generating queries, obtaining responses from individuals and participants, compiling results, and/or causing display of compiled results. Furthermore, in some implementations, the agent 302 may use some or all of the foregoing tools in order to recognize the participants 306 are seeking information on the topic covered in the communication session (e.g., the communication session 104). Therefore, at least some or all of the foregoing tools enable the agent 302 to recognize speech and/or gestures of independent participants or individuals. This ability to recognize speech and/or gestures of independent participants or individuals allows the agent 302 to recognize (e.g., using speech from a plurality of independent participants) when a plurality of participants or a plurality of individuals are seeking consensus on a discussed topic and/or seeking information related to a discussed topic. Furthermore, the ability to recognize speech and/or gestures of independent participants or individuals allows the agent 302 (e.g., using parsed speech from a plurality of independent participants) to queries. For example, the agent 302 may generate queries based on the same or similar questions posed by a plurality of participants seeking consensus on a discussed topic. In a similar manner, the agent 302 may generate queries based on the similar or same questions posed by a plurality of participants seeking information on a topic covered in the communication session.

The discussions heard or perceived and/or the gestures recognized by the agent 302 may be collected and stored as data in a data storage 308 associated with the computerized agent 302. In some implementations, the stored data is video and/or audio data associated with the discussions heard or perceived and/or the gestures recognized by the agent 302. The agent 302 may analyze the data to determine that the participants 306 are seeking consensus on a discussed topic and/or to identify that the participants 306 are seeking individuals having expertise related to a topic discussed during the communication session. The computerized agent 302 may perform the analysis as the data is stored in the data storage 308. Specifically, the agent 302 may perform the data analysis in real time. In other implementations, the agent 302 may perform the data analysis once the data is stored in the data storage 308. Therefore, the agent 302 may perform the data analysis on a live or recorded communication session.

The agent 302 may generate a query/poll 310. The query 310 may be in the form of a poll including a plurality of selectable questions or options. In other implementations, the query 310 is in the form of a single question. The query 310 may be generated based on discussions heard or perceived and/or the gestures recognized by the agent 302. For example, in some implementations, the agent 302 may recognize from the data associated with discussions heard or perceived, and/or recognized gestures that some of the participants 306 are seeking consensus on a discussed topic, and in response generate the query 310. Alternatively, in some implementations, the agent 302 may recognize from the data associated with discussions heard or perceived, and/or recognized gestures that some of the participants 306 are seeking individuals with expertise related to a discussed topic, and in response generate the query 310.

In some implementations, the agent 302 may recognize, based on participant discussions and/or gestures, that the participants 306 are seeking consensus for a meeting to occur at some future time and place. The agent 302 may generate the query 310 to assist the participants 306 in determining an appropriate time and place for the meeting. For example, the query 310 may include one or more suggested times, dates and places for the meeting. Each of those one or more suggested times, dates and places may be selectable by a recipient of the query 310. The one or more suggested times, dates and places may be generated by the agent 302 based on analysis of the data associated with discussions heard or perceived and/or recognized gestures of some of the participants 306. For example, the agent 302 may determine that one or more of the participants 306 has suggested one or more times, dates and places for the meeting. Those suggested one or more times, dates and places for the meeting may serve as a basis for generating the query 310.

Similarly, in some implementations, the agent 302 may recognize, based on participant discussions and/or gestures, that the participants 306 are seeking expertise related to a topic discussed during the communication session. The agent 302 may generate a query 310 to assist in identifying one or more individuals that may have expertise related to the topic discussed during the communication session. Specifically, the query 310 may include one or more questions inquiring if recipients of the query 310 have expertise related to the topic discussed during the communication session.

The query 310 may be provided to one or more of the participants 306 associated with the communication session GUI 304. In some implementations, the query 310 may be communicated to data processing devices associated with the participants 306. For example, the query 310 may be sent to computing devices belonging to the participants 306. Such computing devices may include mobile devices, laptop computers, desktop computers, and the like. In other implementations, the query 310 may be displayed on a display device collectively viewable by one or more of the participants 306. In such an implementation, the agent 302 may collect participant responses to the query 310 by analyzing voice and/or gesture data associated with the participants 306.

In some implementations, the query 310 may be communicated to an external communication session GUI 312. The external communication session GUI 312 may be a general communication channel that hosts individuals that have an association with the participants 306. For example, the external communication session GUI 312 may host team members 314 that are linked to the participants 306. In some implementations, the team members 314 and the participants 306 may be a part of the same enterprise team, university course, school class, or the like.

In some implementations, the external communication session GUI 312 is a chat channel 316 that hosts individuals that have an association with the participants 306. Alternatively, in some implementations, the external communication session GUI 312 is an email client that is available on data processing devices associated with the team members 314. In general, the external communication session GUI 312 may be any user interface conduit for receiving the query 310 and allowing user interaction with the query 310.

The query 310 may be provided to the external communication session GUI 312 associated with an individual 318 having expertise that may be related to a topic discussed by the participants 306 during a communication session. In some implementations, the individual 318 is a human being. However, in some implementations, the individual 318 may be an artificial intelligence (AI) entity. The external communication session GUI 312 may be an email client, a chat channel, instant messaging channel, or the like, associated with the individual 318. In some implementations, the external communication session GUI 312 may be a user interface associated with an AI entity. In some implementations, in order to identify individuals that may have expertise related to a topic discussed in the communication session, the agent 302 may communicate the query 310 to a plurality of external communication session GUIs 312, where each of the plurality of external communication session GUIs 312 is associated with an individual that may have expertise related to a topic discussed in the communication session.

In some implementations, the agent 302 may be coupled to a database 320. The database 320 may be associated with an enterprise, such as a business, a school, or other entity. The database 320 may store a plurality of individual profiles that may be searched by the agent 302. In some implementations, the individual profiles each reference and individual's connection to other individuals in an enterprise, school, team, or the like. Furthermore, each of the individual profiles may reference an individual's skill set, such as education, employment history, fields of expertise (e.g., technical expertise), and the like. Furthermore, each of the individual profiles may reference an individual's contact information, such as email contact information, office location and address, residence address, communication channel associations, instant messaging connectivity data, and the like.

The agent 302 may search the database 320 to identify individuals that may have an association with the participants 306 of the communication session. Furthermore, the agent 302 may search the database 320 to identify individuals that may have expertise related to a topic discussed by the participants 306 of the communication session. Therefore, the database 320 enables the agent 302 to retrieve information, such as contact information in the form of email addresses, office locations, and the like, that enables the agent 302 to establish communication with one or more external communication session GUIs 312 and/or individuals of interest based on discussions by the participants 306.

In some implementations, the agent 302 may receive query/poll responses 322 and/or query/poll responses 324. Specifically, the agent 302 may receive responses 322 from one or more of the participants 306 associated with the communication session GUI 304. Those responses 322 may be from the query 310, which was generated when the agent 302 determined that the participants 306 are seeking consensus on a topic discussed during the communication session associated with the communication session GUI 304. Furthermore, in some implementations, the agent 302 may receive responses 324 from individuals having an association with the participants 306. As discussed in the foregoing, such individuals may be team members of the participants 306, colleagues, or the like.

The agent 302 may analyze the query responses 322 and/or the responses 324 to compile a result 326 that is conveyed to the communication session GUI 304 and/or the external communication session GUI 312. In some implementations, the result 326 is conveyed to one or more data processing devices associated with the participants 306 and/or one or more data processing devices associated with individuals, such as the team members 314, having an association with the participants 306.

The result 326 may provide consensus information to the participants 306 and/or the team members 314, based on responses to the query 310. For example, the query 310 may have included one or more options for a date, time and location for a follow-up communication session discussed by the participants 306. The participants 306 and/or the team members 314 may have responded to the query 310, by way of the responses 322 and/or the responses 324, with a preferred date, time and/or location for the follow-up communication session. In some implementations, the agent 302 compiles the result 326, which in this case, includes the participants' 306 and/or the team members' 314, and/or the responses' 324 preferred date, time and/or location for the follow-up communication session.

In some implementations, the agent 302 may receive responses 324 from one or more of the individuals 318 associated with one or more of the external communication session GUIs 312. Those responses 324 may be from the query 310, which was generated when the agent 302 determined that the participants 306 were seeking one or more individuals having expertise related to a topic discussed during the communication session associated with the communication session GUI 304.

The agent 302 may analyze the query responses 324 to compile a result 326 that is conveyed to the communication session GUI 304. In some implementations, the result 326 is conveyed to one or more data processing devices associated with the participants 306. The result 326 may include the names and contact information of individuals 318 that confirmed, via the query responses 324, that they have expertise related to the topic discussed during the communication session associated with the communication session GUI 304. The contact information of individuals 318 that confirmed that they have expertise related to the topic discussed during the communication session may be conveyed to the agent 302 by way of the query responses 324. Alternatively, the agent 302 may extract the contact information associated with the individuals 318 that confirmed that they have expertise related to the topic discussed during the communication session from the database 320.

In some implementations, the agent 302 uses a consensus threshold before generating the query 310. Specifically, the agent 302 analyzes discussions heard or perceived and/or the gestures recognized by the agent 302 to determine if a number of the participants 306 seeking consensus on a topic exceeds or is at least equal to the consensus threshold. Therefore, the consensus threshold may be an integer value greater than 0. For example, the consensus threshold may be a participant threshold number having an integer value greater than 0. In some implementations, the agent 302 analyzes stored data and the data storage 308 to determine if the consensus threshold has been met or exceeded before generating the query 310. In some implementations, the agent 302 will not generate the query 310 unless the consensus threshold is at least met or exceeded.

Figure 4:
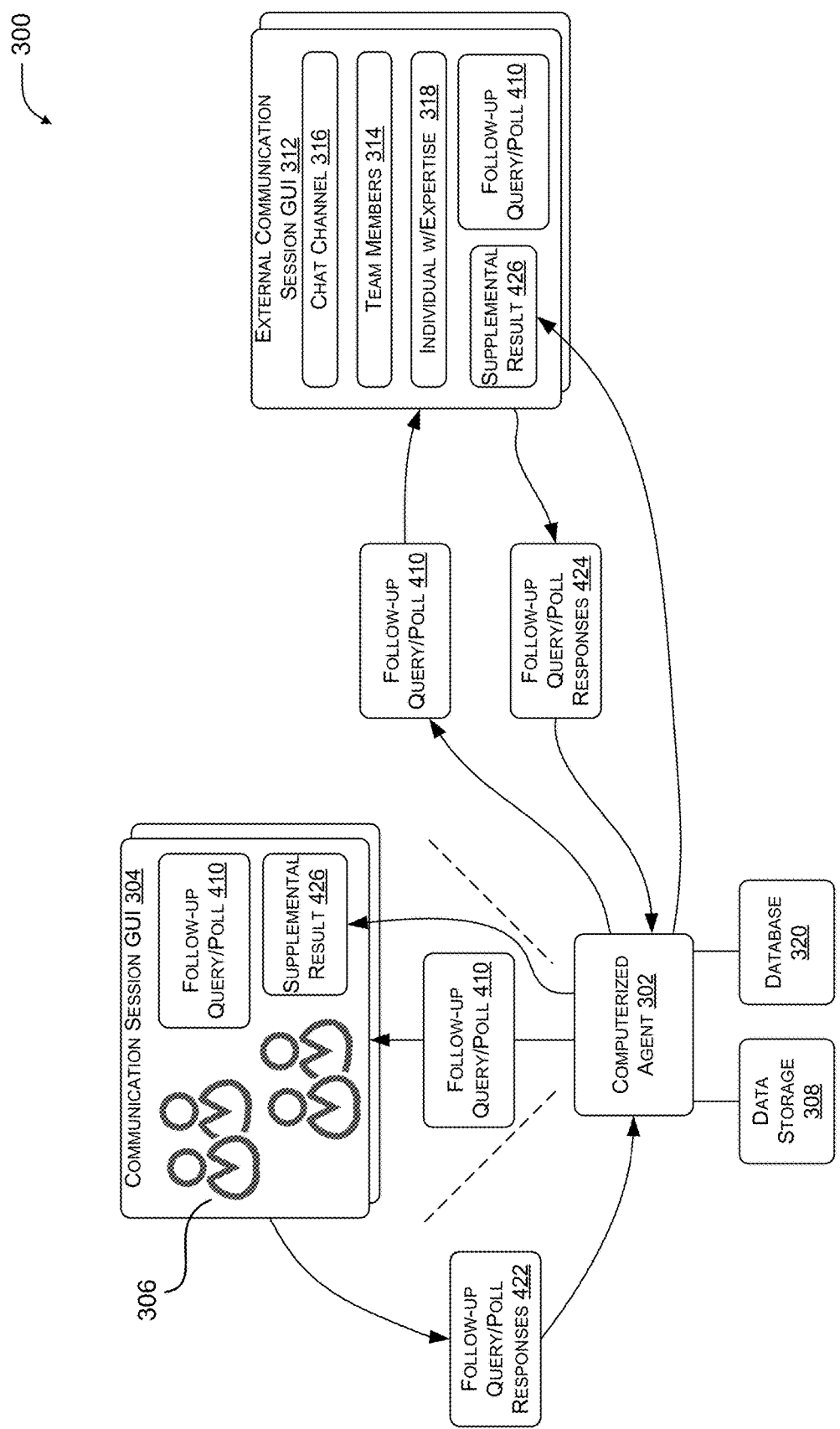
FIG. 4 illustrates the example environment in which a computerized agent or bot may operate to collect follow-up data shared between participants in a communication session.

FIG. 4 illustrates the example environment 300 in which the computerized agent or bot 302 may operate to collect follow-up data shared between participants in a communication session. Specifically, FIG. 4 illustrates that the agent 302 may generate a follow-up query/poll 410 as well as receive follow-up query/poll responses 422 and 424. Furthermore, the agent 302 may provide supplemental results 426. The generated follow-up query/poll 410 as well as received follow-up query/poll responses 422 and 424 occur subsequent to the actions made by the agent 302 as illustrated in FIG. 3 and described in connection therewith. Similarly, the computerized agent 302 may provide supplemental results 426 to the communication session GUI 304, data processing devices associated with the participants 306, the external communication session GUI 312, and/or data processing devices associated with team members 314 or individuals 318.

In some implementations, the agent 302 may analyze the result 326 to determine a decision when the result indicates a threshold level of agreement associated with the participants 306 and the team members 314 has been met or exceeded. The threshold level of agreement may be an integer value greater than 0. In some implementations, when the agent 302 determines that the participants' 306 and the team members' 314 level of agreement on a topic requiring consensus meets or exceeds the threshold level of agreement, the follow-up query 410 is generated by the agent 302. The follow-up query 410 may relate to a sub-topic to the topic requiring consensus discussed by the participants 306. For example, in some implementations, the topic requiring consensus may be a date, time and location for a follow-up meeting or communication session. In some implementations, the follow-up query 410 may suggest a number of different locations for lunch, dinner, or the like, which are located in close proximity to the location of the follow-up meeting or communication session. The participants 306 and/or the team members 314 may respond to the follow-up query 410 in the same manner discussed in connection with the query 310.

Similarly, in some implementations, the agent 302 may analyze the result 326, which identifies one or more individuals 318 having expertise related to a topic discussed by the participants 306 in a communication session associated with the communication session GUI 304. In response to the analysis by the agent 302, the agent may generate the follow-up query 410 to be communicated to the identified one or more individuals 318 having expertise related to the topic discussed by the participants 306. For example, the follow-up query 410 communicated to the identified one or more individuals 318 having expertise related to the topic discussed by the participants 306 may request confirmation that the one or more individuals 318 are available to assist the participants 306. The one or more individuals 318 may respond to the follow-up query 410 in the same manner discussed in connection with the query 310.

Figure 5:
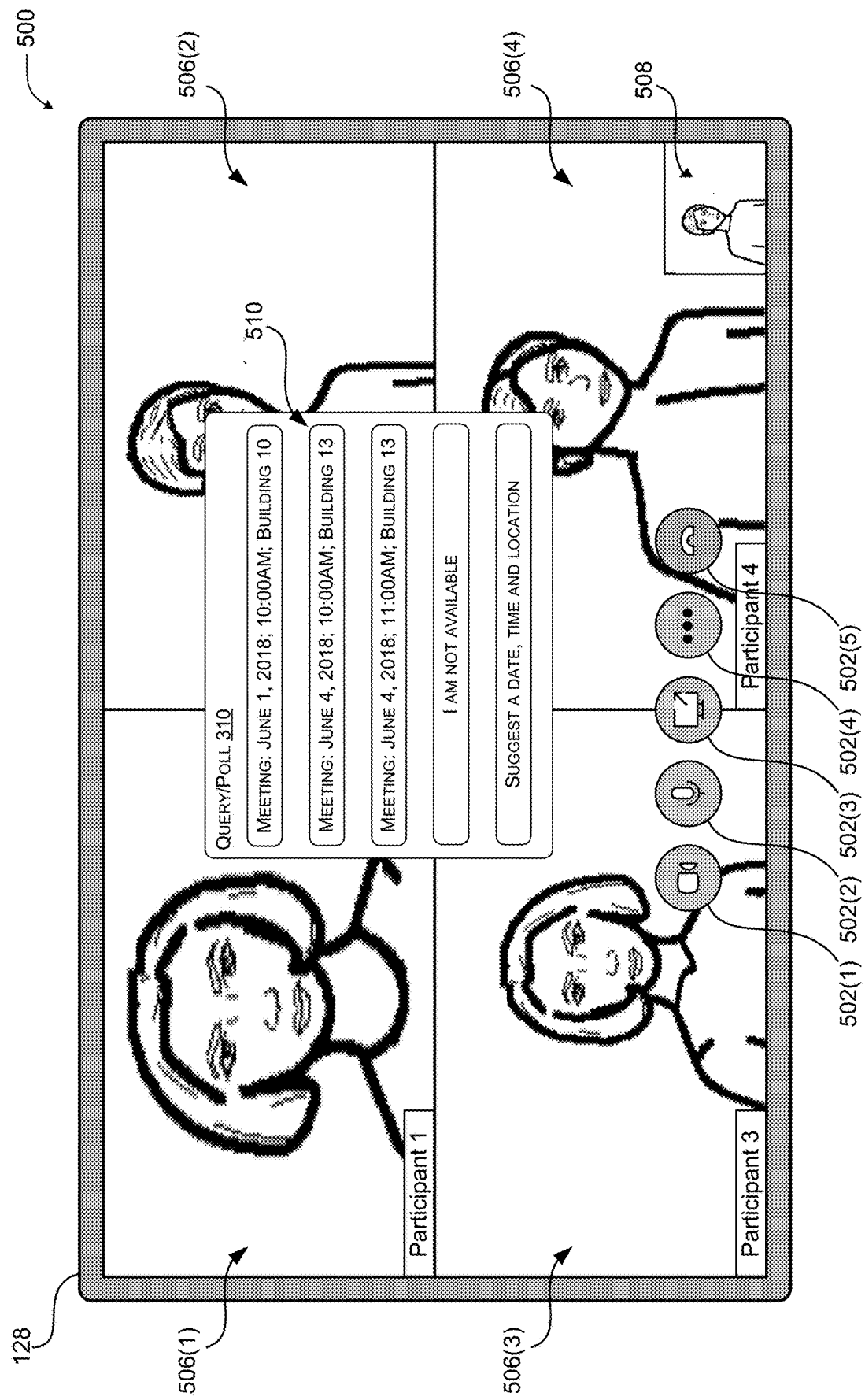
FIG. 5 illustrates an exemplary presentation GUI configured to display a persistent view that includes four distinct regions, sections, areas, or grids that each correspond to a particular participant of a communication session.

FIG. 5 illustrates an exemplary presentation GUI 500 configured to display a persistent view that includes four distinct regions, sections, areas, or grids 506 that each correspond to a particular participant of a communication session 104. The exemplary presentation GUI 500 may be an implementation of the communication session GUI 304. The exemplary presentation GUI 500 may be rendered on one or more data processing devices associated with participants of the communication session 104. In some implementations, each of the participants is viewing the exemplary presentation GUI 500 on his or her own data processing device. In other implementations, some of the participants may be viewing the exemplary presentation GUI 500 on a common data processing device.

The presentation GUI 500 may include any number of sections 506. Therefore, the illustrated four sections 506 are exemplary. In some implementations, one or more of the grids 506 may correspond to an image of a particular participant in the communication session 104, or one or more of the grids 506 may alternatively display an avatar associated with a particular participant. The following description applies to communication feeds that include participant renderings, avatar renderings, content renderings, and the like.

When multiple participants, such as the participants 306, are displayed within the presentation GUI 500, the system 102 may identify in which portion of the display 128 each participant is to be displayed. For example, in the illustrated scenario, the presentation GUI 500 includes four distinct regions, sections, areas or grids labeled 506(1) through 506(4) that each correspond to a particular participant of the communication session 104. In this particular example, a first region 506(1) corresponds to a first participant "Participant 1" that is a most dominant participant, a second region 506(2) corresponds to a second participant "Participant 2" that is a second-most dominant participant, etc. For example, the first participant "Participant 1" may be actively presenting or speaking in the communication session 104, and the second participant "Participant 2" may be consuming that which the first participant is actively presenting. Similarly, the third participant "Participant 3" and the fourth participant "Participant 4" may also be consuming that which the first participant is actively presenting.

As illustrated, the GUI 500 may also include five user interface elements (UIE) 502 labeled 502(1) through 502(5). More specifically, the GUI 300 may include a video on/off UIE 502(1) to enable the user to control whether video is streamed from the user's client computing device in association with the communication session 104, an audio on/off UIE 502(2) to enable the user to control whether audio is streamed from the user's client computing device in association with the communication session 104, a share-control UIE 502(3) to enable the user to selectively expose and/or hide a share-tray GUI, an additional control UIE 502(4) to enable the user to selectively expose and/or hide additional controls in association with the communication session 104, and a "hang up" UIE 302(5) to enable the user to exit the communication session 104.

As further illustrated, the GUI 500 may include a mirror-view region 508 that displays to the user on the user's own device how the user appears to other participants of the communication session 104 within a corresponding region 506 on the other participants' client computing devices.

FIG. 5 further illustrates the query/poll 310. The follow-up query/poll 410 may be displayed in a similar manner as the query/poll 310 illustrated in FIG. 5. Furthermore, while not illustrated in FIG. 5, the result 326 and the supplemental result 426 may also be displayed in the GUI 500. As illustrated, the query/poll 310 may include a plurality of selectable elements 510. The selectable elements 510 are selectable by way of a data processing device rendering or displaying the GUI 500. For example, the selectable elements 510 may be selected by way of touch and/or mouse pointer. The agent 302, as discussed, is functional to collect query/poll responses by participants of the communication session 104. In some implementations, participants of the communication session 104 may verbally select the content of one of the selectable elements 510. The agent 302 is functional to collect such verbal responses to the query/poll 310. In some implementations, the agent 302 is further functional to collect gesture responses to the query/poll 310. For example, one of the participants of the communication session 104 may verbally respond that they wish to schedule the meeting on Jun. 4, 2018 at 11 AM. Subsequently, another participant may make 'a thumbs up' gesture or nod in approval to scheduling the meeting on Jun. 4, 2018 at 11 AM. The agent 302 is functional to collect the verbal response as well as the gesture response as an affirmative to scheduling the meeting on Jun. 4, 2008 at 11 AM.

Figure 6:
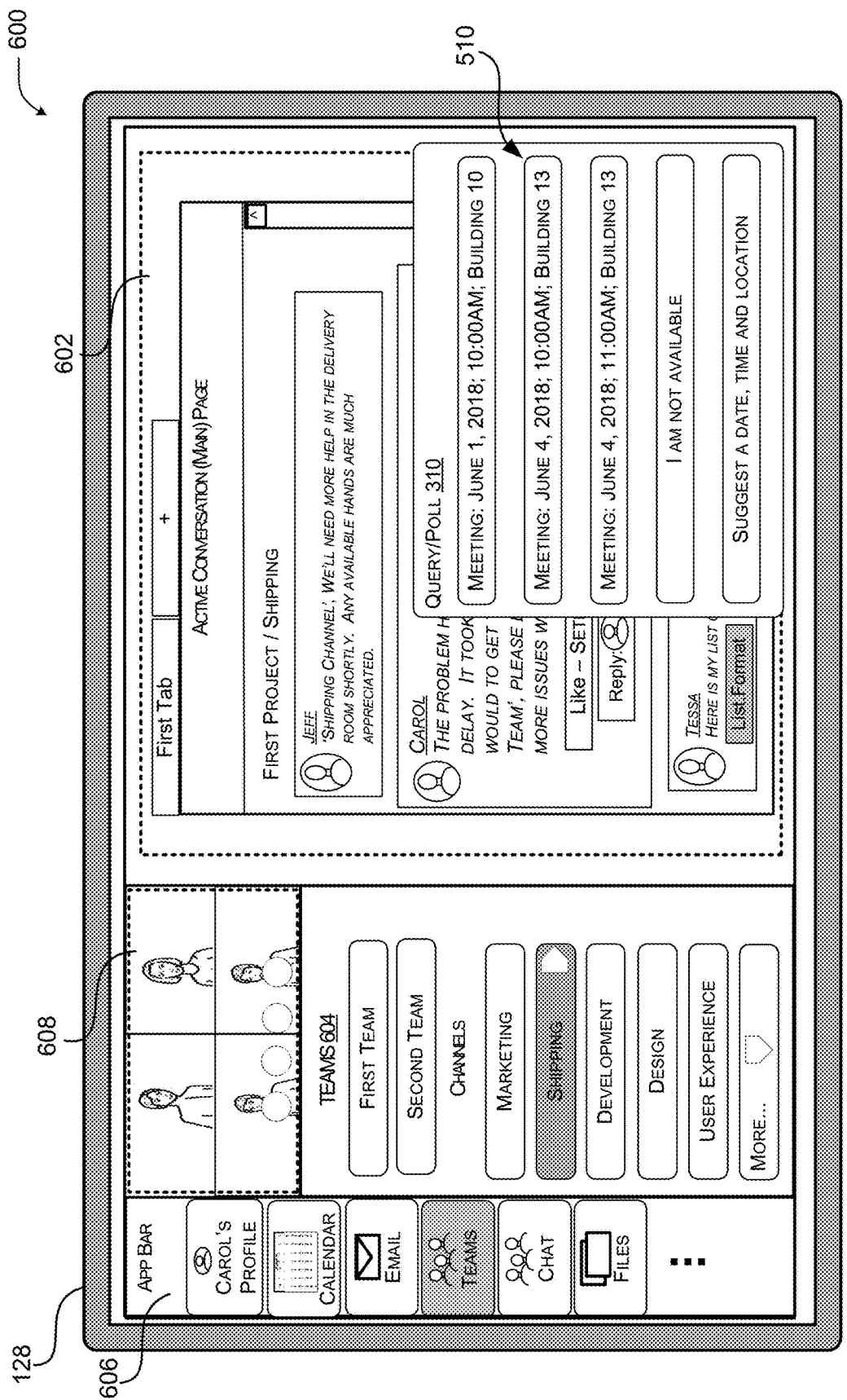
FIG. 6 illustrates an exemplary presentation GUI configured to display a view that includes, for example, a chat region, a teams region, and an application bar region.

FIG. 6 illustrates an exemplary presentation GUI 600 configured to display a view that includes, for example, a chat region 602, a teams region 604, and an application bar region 606. In some implementations, the exemplary presentation GUI 600 is an implementation of the external communication session GUI 312. FIG. 6 illustrates that the teams region 604 includes various teams and channels associated with an individual, such as a user of the presentation GUI 600. Different channels or teams may be selected. For example, the user can select the "Shipping" button to view the contents of that channel. The exemplary presentation GUI 600 further includes an active communication session area 608. The active communication session area 608 may display a communication session 104 that is ongoing. In some implementations, the active communication session area 608 displays a communication session 104 having participants, for example the participants 306, that have an association with the user of the exemplary presentation GUI 600.

FIG. 6 further illustrates the query/poll 310. The follow-up query/poll 410 may be displayed in a similar manner as the query/poll 310 illustrated in FIG. 6. Furthermore, while not illustrated in FIG. 6, the result 326 and the supplemental result 426 may also be displayed in the GUI 600. As illustrated, the query/poll 310 may include a plurality of selectable elements 510. The selectable elements 510 are selectable by way of a data processing device rendering or displaying the GUI 600. For example, the selectable elements 510 may be selected by way of touch and/or mouse pointer. The agent 302, as discussed, is functional to collect query/poll responses by an individual or user associated with the GUI 600. In some implementations, a user of the GUI 600 may verbally select the content of one of the selectable elements 510. The agent 302 is functional to collect such verbal responses to the query/poll 310.

Figure 7:
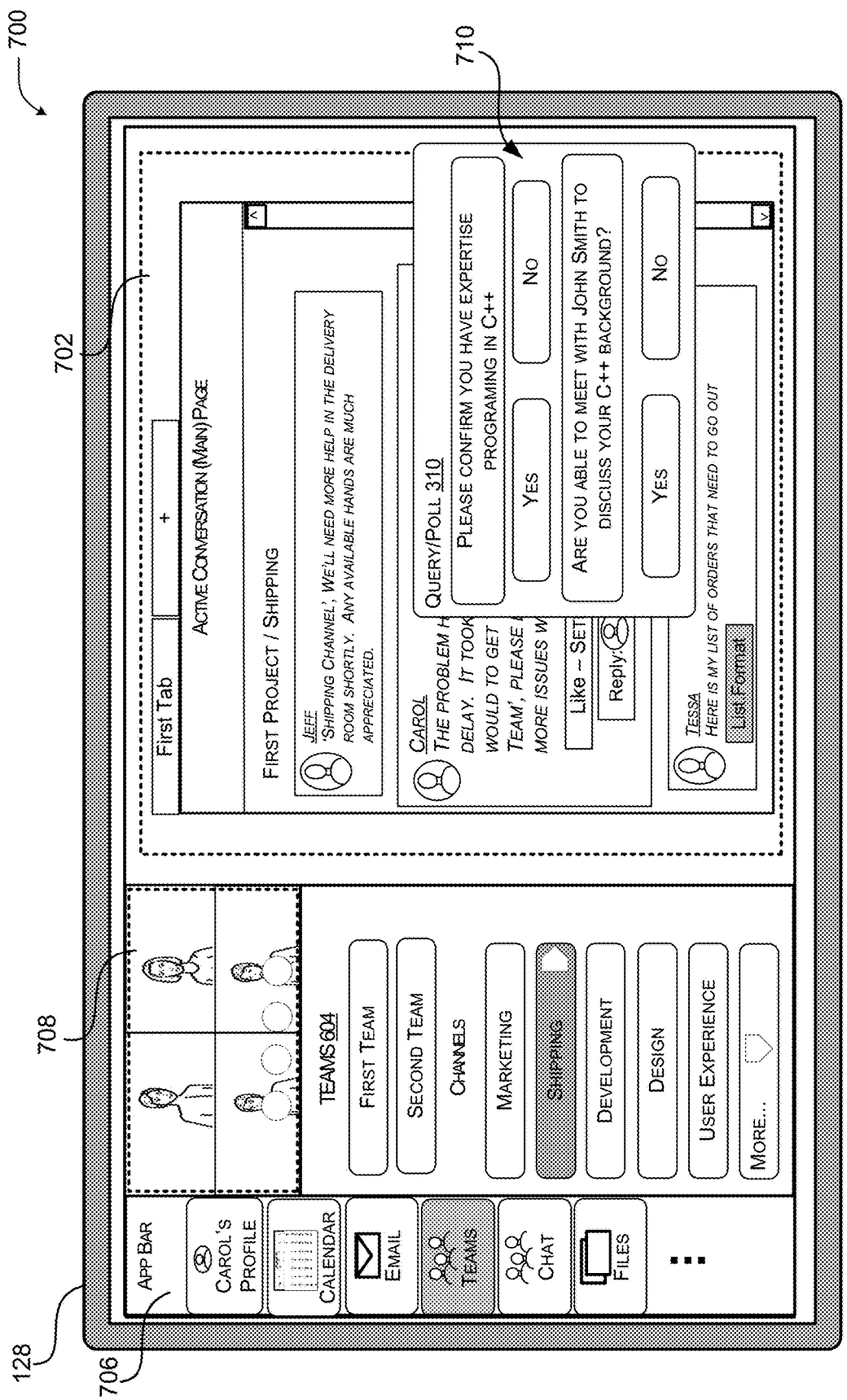
FIG. 7 illustrates an exemplary presentation GUI configured to display a view that includes, for example, a chat region, a teams region, and an application bar region.

FIG. 7 illustrates an exemplary presentation GUI 700 configured to display a view that includes, for example, a chat region 702, a teams region 704, and an application bar region 706. In some implementations, the exemplary presentation GUI 700 is an implementation of the external communication session GUI 312. FIG. 7 illustrates that the teams region 704 includes various teams and channels associated with an individual, such as a user of the presentation GUI 700. Different channels or teams may be selected. For example, the user can select the "Shipping" button to view the contents of that channel. The exemplary presentation GUI 700 further includes an active communication session area 708. The active communication session area 708 may display a communication session 104 that is ongoing. In some implementations, the active communication session area 708 displays a communication session 104 having participants, for example the participants 306, discussing a topic, where the participants are seeking expertise related to the topic. The active communication session area 708 may display other communication sessions.

FIG. 7 further illustrates the query/poll 310. The follow-up query/poll 410 may be displayed in a similar manner as the query/poll 310 illustrated in FIG. 7. Furthermore, while not illustrated in FIG. 7, the result 326 and the supplemental result 426 may also be displayed in the GUI 700. As illustrated, the query/poll 310 may include a plurality of selectable elements 710. The selectable elements 710 are selectable by way of a data processing device rendering or displaying the GUI 700. For example, the selectable elements 710 may be selected by way of touch and/or mouse pointer. The agent 302, as discussed, is functional to collect query/poll responses by an individual or user associated with the GUI 700. In some implementations, a user of the GUI 700 may verbally select the content of one of the selectable elements 710. The agent 302 is functional to collect such verbal responses to the query/poll 310.

Figure 8:
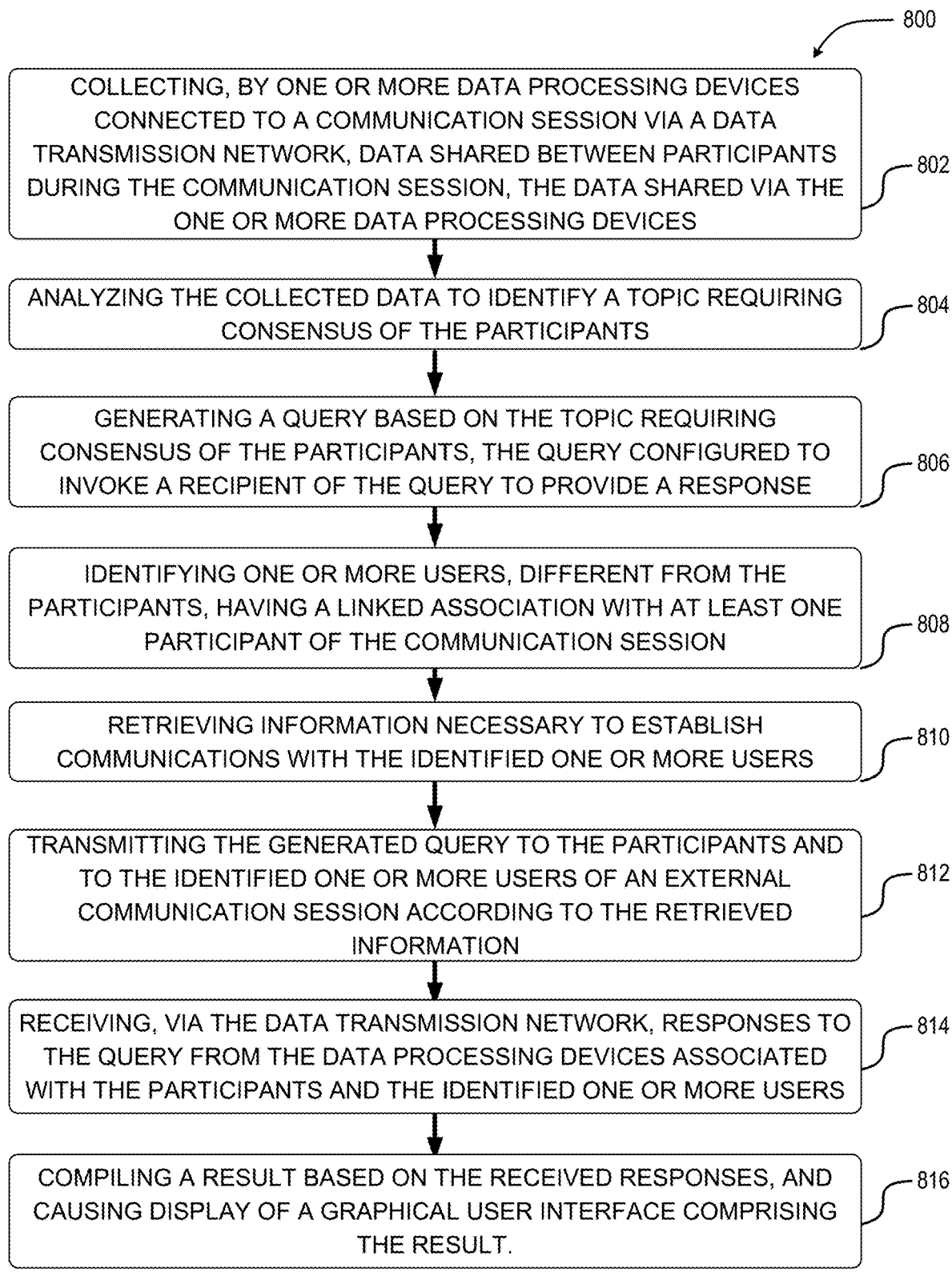
FIG. 8 is a diagram of an example flowchart that illustrates operations associated with a bot or agent linked and/or overseeing one or more communication sessions.

FIG. 8 illustrates an example flowchart. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., system 102, device 110, client computing device 106(N), and/or device 200) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 8 can be implemented in association with the example presentation GUIs described above with respect to FIGS. 1-7. For instance, the various device(s) and/or module(s) in FIGS. 1 and/or 2 can generate, transmit, receive, and/or display data associated with content of a communication session (e.g., live content, recorded content, etc.) and/or a presentation GUI that includes display of one or more participants, avatars, channels, chat sessions, and/or applications associated with a communication session.

FIG. 8 is a diagram of an example flowchart 800 that illustrates operations associated with a bot or agent 302 linked to and/or overseeing one or more communication sessions. In one example, the operations of FIG. 8 can be performed by components of the system 102, environment 100, a client computing device 106, and/or device 200.

At operation 802, the computerized agent 302 may collect data shared between the participants 306 during a communication session (e.g., the communication session 104) via a data transmission network. The data may be shared via one or more data processing devices associated with the participants 306. The computerized agent 302 may also be associated with one or more data processing devices. Therefore, the computerized agent 302 may collect the data shared between the participants 306 by way of one or more data processing devices. In some implementations, the data shared between the participants includes video, audio, and/or gesture data that occurred during the communication session 104.

At operation 804, the agent 302 analyzes the collected data to identify a topic requiring consensus of the participants 306. In some implementations, the topic requiring the consensus of the participants 306 is discussed in the communication session 104. In some implementations, the participants 306 may be seeking a consensus related to a follow-up meeting (e.g., a follow-up communication session), action items related to the topic, where to go to lunch after the communication session 104 closes, and the like. In some implementations, analyzing the collected data includes determining a consensus threshold is satisfied before generating the query, of the operation 806, based on the topic requiring consensus of the participants. For example, the agent 302, prior to generating the query, may first determine the consensus threshold is met or exceeded. The consensus threshold may be a participant threshold number. Therefore, the agent 302, prior to generating the query, may first determine that there are sufficient participants seeking consensus before generating the query. In some implementations, the agent 302 analyzes the collected data to identify voice data and/or gesture data made by the participants to identify a number of the participants contributing to the topic requiring consensus. Before generating the query, the agent 302 confirms that the number of the participants contributing to the topic requiring consensus is at least equal to or greater than the participant threshold number.

At operation 806, the agent 302 generates a query based on the topic requiring consensus of the participants 106. The query may be configured to invoke a recipient of the query to provide a response. In some implementations, a recipient of the query may include one or more of the participants 106. Furthermore, a recipient of the query may include individuals (e.g., team members 314) having a linked association with the participants 106. In some implementations, the linked association means that the individuals work or collaborate on the same team as the participants 106. In other implementations, the linked association means that the individuals are in the same university class as the participants 106. In general, a linked association between users can mean that the users are linked by an entity or organization. A database having organization data defining an organizational chart of an entity can be used to determine when two or more users have a linked association.

At operation 808, the agent 302 identifies one or more users, different from the participants 106, having a linked association with at least one participant 106 of the communication session 104. As discussed in the foregoing, the one or more users having a linked association may include colleagues of the participants 106, fellow students of the participants 106, work or sports team members associated with the participants 106, and the like.

At operation 810, the agent 302 retrieves information necessary to establish communications with the identified one or more users. For example, the agent 302 may access the database 320 to receive necessary connectivity information to enable establishing communications with the identified one or more users. Such retrieved necessary connectivity information may include retrieving one or more email addresses, instant messaging addresses, channels linked to the identified one or more users, and the like.

At operation 812, the agent 302 transmits the generated query to data processing devices associated with the participants 106 and to data processing devices associated with the identified one or more users of an external communication session according to the retrieved information. In some implementations, the agent 302 transmits the query to at least one computing device associated with the participants 106. The computing device may be a mobile phone, a laptop computer, and the like. In some implementations, the external communication session associated with the identified one or more users is different from the communication session in which the participants 106 are actively engaged. For example, the external communication session may be one or more chat channels, team channels, email clients, instant messaging clients, and the like.

At operation 814, the agent 302 receives, via the data transmission network, responses to the query from the data processing devices associated with the participants and the identified one or more users.

At operation 816, the agent 302 compiles a result based on the received responses, and causes the result to be displayed in a graphical user interface. In some implementations, the graphical user interface is the communication session GUI 304 and/or the external communication session GUI 312. In some implementations, the agent 302 may analyze the result to determine a decision when the result indicates a threshold level of agreement associated with the participants 306 and the identified one or more users. In response to determining the decision, the agent 302 may generate a follow-up query related to a subtopic of the topic associated with operation 804. The agent 302 may communicate the follow-up query to the participants and the one or more users. Furthermore, the agent 302 may obtain a supplemental result from the participants and the one or more users, and cause the display of a graphical user interface that includes the supplemental result. Again, the graphical user interface may be the communication session GUI 304 and/or the external communication session GUI 312.

Figure 9:
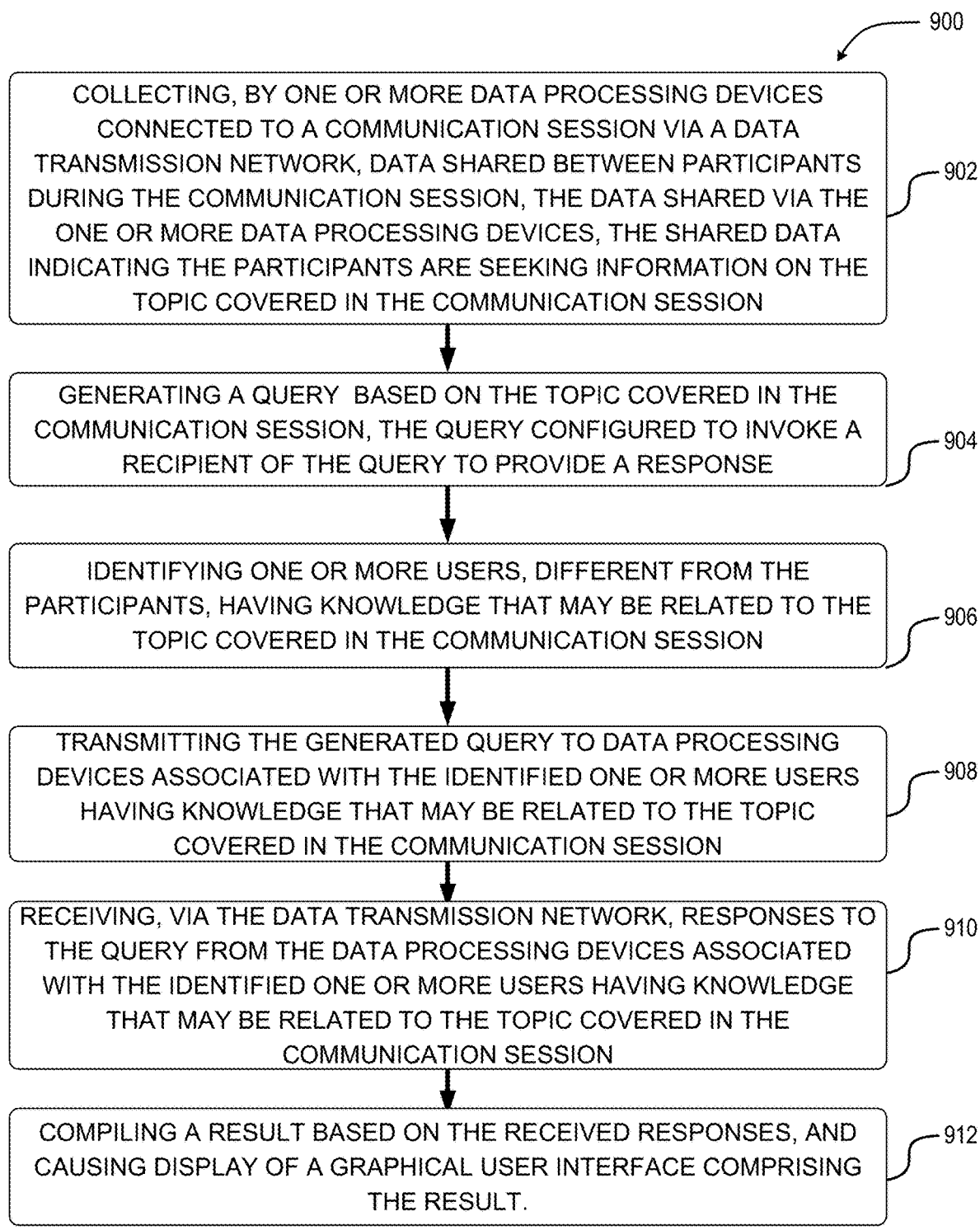
FIG. 9 is a diagram of an example flowchart that illustrates operations associated with a bot or agent linked and/or overseeing one or more communication sessions.

FIG. 9 illustrates an example flowchart. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., system 102, device 110, client computing device 106(N), and/or device 200) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 9 can be implemented in association with the example presentation GUIs described above with respect to FIGS. 1-7. For instance, the various device(s) and/or module(s) in FIGS. 1 and/or 2 can generate, transmit, receive, and/or display data associated with content of a communication session (e.g., live content, recorded content, etc.) and/or a presentation GUI that includes display of images of one or more participants, avatars, channels, chat sessions, and/or applications associated with a communication session.

FIG. 9 is a diagram of an example flowchart 900 that illustrates operations associated with a bot or agent 302 linked to and/or overseeing one or more communication sessions. In one example, the operations of FIG. 9 can be performed by components of the system 102, environment 100, a client computing device 106, and/or device 200.

At operation 902, the computerized agent 302 may collect data shared between the participants 306 during a communication session (e.g., the communication session 104). The data may be shared via one or more data processing devices associated with the participants 306. The computerized agent 302 may also be associated with one or more data processing devices. Therefore, the computerized agent 302 may collect the data shared between the participants 306 by way of one or more data processing devices. In some implementations, the data shared between the participants includes video, audio, and/or gesture data that occurred during the communication session 104. In some implementations, the shared data indicates that the participants 306 are seeking information on the topic covered in the communication session.

In some implementations, the agent 302 determines if a consensus threshold is satisfied before generating the query, of the operation 904, based on the topic covered in the communication session. For example, the agent 302, prior to generating the query, may first determine the consensus threshold is met or exceeded. The consensus threshold may be a participant threshold number. Therefore, the agent 302, prior to generating the query, may first determine that there are sufficient participants seeking information on the topic covered in the communication session. In some implementations, the agent 302 analyzes the collected data to identify voice data and/or gesture data made by the participants to identify a number of the participants seeking information on the topic covered in the communication session. Before generating the query, the agent 302 confirms that the number of the participants seeking information on the topic covered in the communication session is at least equal to or greater than the participant threshold number.

At operation 904, the agent 302 generates a query based on the topic covered in the communication session. The query may be configured to invoke a recipient of the query to provide a response. In some implementations, the query may include a question asking if a recipient of the query has a desired technical background or expertise related to the topic covered in the communication session.

At operation 906, the agent 302 identifies one or more users, different from the participants 106, having knowledge that may be related to the topic covered in the communication session. For example, the agent 302 may identify one or more users that has technical expertise related to the topic covered in the communication session. In one example, the topic covered in the communication session may indicate that the participants 106 are seeking one or more individuals having the technical expertise needed to program in C++. In some implementations, the agent 302 accesses the database 320 to search for the one or more individuals that have the needed technical expertise related to the topic covered in the communication session.

At operation 908, the agent 302 transmits the generated query to data processing devices associated with the identified one or more users having knowledge that may be related to the topic covered in the communication session. In some implementations, the agent 302 transmits the query to at least one computing device associated with the individual 318. The computing device may be a mobile phone, a laptop computer, and the like. In some implementations, the individual 318 may be associated with an external communication session. For example, the external communication session may be one or more chat channels, team channels, email clients, instant messaging clients, and the like.

At operation 910, the agent 302 receives, via the data transmission network, responses to the query from the data processing devices associated with the identified one or more users having knowledge that may be related to the topic covered in the communication session.

At operation 912, the agent 302 compiles a result based on the received responses, and causes the result to be displayed in a graphical user interface. In some implementations, the graphical user interface is the communication session GUI 304 and/or the external communication session GUI 312. In some implementations, the agent 302 may analyze the result to determine a decision when the result indicates a threshold level of agreement associated with the participants 306. In response to determining the decision, the agent 302 may generate a follow-up query related to a subtopic of the topic covered in the communication session. The agent 302 may communicate the follow-up query to the participants and/or the identified one or more users having knowledge that may be related to the topic covered in the communication session. Furthermore, the agent 302 may obtain a supplemental result from the participants and/or the identified one or more users, and cause the display of a graphical user interface that includes the supplemental result. Again, the graphical user interface may be the communication session GUI 304 and/or the external communication session GUI 312.

Example Clauses

The disclosure presented herein may be considered in view of the following clauses.

Clause 1. A computer implemented method, comprising: collecting, by one or more data processing devices connected to a communication session via a data transmission network, data shared between participants during the communication session, the data shared via the one or more data processing devices, the shared data indicating the participants are seeking information on a topic covered in the communication session; generating a query based on the topic covered in the communication session, the query configured to invoke a recipient of the query to provide a response; identifying one or more individuals, different from the participants, having knowledge that may be related to the topic covered in the communication session; transmitting the generated query to data processing devices associated with the identified one or more individuals having knowledge that may be related to the topic covered in the communication session; receiving, via the data transmission network, responses to the query from the data processing devices associated with the identified one or more individuals having knowledge that may be related to the topic covered in the communication session; compiling a result based on the received responses; and causing display of a graphical user interface comprising the result.

Clause 2. The computer implemented method according to Clause 1, comprising determining a consensus threshold is satisfied before generating the query based on the topic covered in the communication session.

Clause 3. The computer implemented method according to Clause 1, wherein the consensus threshold is a participant threshold number, and determining the consensus threshold is satisfied comprises: analyzing the collected data to identify voice data or gesture data made by the participants to identify a number of the participants seeking information on the topic covered in the communication session, and confirming the number of the participants seeking information on the topic covered in the communication session is at least equal to or greater than the participant threshold number.

Clause 4. The computer implemented method according to Clause 1, wherein identifying the one or more individuals having knowledge that may be related to the topic covered in the communication session comprises searching a database that is searchable for individuals based on subject matter expertise.

Clause 5. The computer implemented method according to Clause 1, comprising causing display of the query in a graphical user interface on the data processing devices associated with the identified one or more individuals having knowledge that may be related to the topic covered in the communication session, the query comprising a plurality of user selectable responses.

Clause 6. The computer implemented method according to Clause 1, comprising: analyzing the result for identifying one or more individuals having knowledge related to the topic covered in the communication session; in response to identifying the one or more individuals, generating a follow-up query for the one or more individuals having knowledge related to the topic covered in the communication session; communicating the follow-up query to the one or more individuals having knowledge related to the topic covered in the communication session; compiling a supplemental result based on responses to the follow-up query from the one or more individuals having knowledge related to the topic covered in the communication session; and causing display of a graphical user interface comprising the supplemental result.

Clause 7. The computer implemented method according to Clause 1, further comprising recognizing the topic by parsing voice of at least a plurality of the participants to identify the plurality of the participants are seeking the information related to the discussed topic.

Clause 8. The computer implemented method according to Clause 1, wherein generating the query includes deriving the query from similar or same questions posed by a plurality of the participants seeking information on the topic covered in the communication session.

Clause 9. A computer implemented method, comprising: collecting, by one or more data processing devices connected to a communication session via a data transmission network, data shared between participants during the communication session, the data shared via the one or more data processing devices, the shared data indicating the participants are seeking consensus on a topic covered in the communication session; generating a query based on the topic covered in the communication session, the query configured to invoke a recipient of the query to provide a response; identifying one or more individuals, different from the participants, having a linked association with at least one participant of the communication session; transmitting the generated query to data processing devices associated with the participants and to data processing devices associated with the identified one or more individuals of an external communication session; receiving, via the data transmission network, responses to the query from the data processing devices associated with the participants and the identified one or more individuals; compiling a result based on the received responses; and causing display of a graphical user interface comprising the result.

Clause 10. The computer implemented method according to Clause 9, comprising: analyzing the result for determining a decision when the result indicates a threshold level of agreement of the participants and the one or more individuals; in response to determining the decision, generating a follow-up query related to a sub-topic to the topic; communicating the follow-up query to the participants and the one or more individuals; compiling a supplemental result based on responses to the follow-up query from the participants and the one or more individuals; and causing display of a graphical user interface comprising the supplemental result.

Clause 11. The computer implemented method according to Clause 9, comprising determining a consensus threshold is satisfied before generating the query based on the topic covered in the communication session.

Clause 12. The computer implemented method according to Clause 11, wherein the consensus threshold is a participant threshold number, and determining the consensus threshold is satisfied comprises: analyzing the collected data to identify voice data or gesture data made by the participants to identify a number of the participants contributing to the topic covered in the communication session, and confirming the number of the participants contributing to the topic covered in the communication session is at least equal to or greater than the participant threshold number.

Clause 13. The computer implemented method according to Clause 9, wherein the external communication session is a communication channel, the communication channel providing a graphical user interface allowing individuals linked to the communication channel to communicate using text based chat or voice based chat.

Clause 14. The computer implemented method according to Clause 9, wherein identifying the one or more individuals having the linked association with the at least one participant of the communication session comprises verifying the one or more individuals and the at least one participant are part of a common team or group.

Clause 15. The computer implemented method according to Clause 9, comprising causing display of the query in a graphical user interface, the query comprising a plurality of user selectable responses.

Clause 16. A system, comprising: one or more data processing devices; and a computer-readable medium having encoded thereon computer-executable instructions to cause the one or more data processing devices to: collect, by the one or more data processing devices connected to a communication session via a data transmission network, data shared between participants during the communication session, the data shared via the one or more data processing devices, the shared data indicating the participants are seeking consensus on a topic covered in the communication session; generate a query based on the topic covered in the communication session, the query configured to invoke a recipient of the query to provide a response; identify one or more individuals, different from the participants, having a linked association with at least one participant of the communication session; transmit the generated query to data processing devices associated the participants and to data processing devices associated with the identified one or more individuals of an external communication session; receive, via the data transmission network, responses to the query from the data processing devices associated with the participants and the identified one or more individuals; compile a result based on the received responses; and cause display of a graphical user interface comprising the result.

Clause 17. The system according to Clause 16, wherein the instructions further cause the one or more data processing devices to: analyze the result for determining a decision when the result indicates a threshold level of agreement of the participants and the one or more individuals; in response to determining the decision, generate a follow-up query related to a sub-topic to the topic; communicate the follow-up query to the participants and the one or more individuals; compile a supplemental result based on responses to the follow-up query from the participants and the one or more individuals; and cause display of a graphical user interface comprising the supplemental result.

Clause 18. The system according to Clause 16, comprising determining a consensus threshold is satisfied before generating the query based on the topic covered in the communication session.

Clause 19. The system according to Clause 18, wherein the consensus threshold is a participant threshold number, and determining the consensus threshold is satisfied comprises: analyzing the collected data to identify voice data or gesture data made by the participants to identify a number of the participants contributing to the topic covered in the communication session, and confirming the number of the participants contributing to the topic covered in the communication session is at least equal to or greater than the participant threshold number.

Clause 20. The system according to Clause 16, wherein the external communication session is a communication channel, the communication channel providing a graphical user interface allowing individuals linked to the communication channel to communicate using text based chat or voice based chat.

Clause 21. The system according to Clause 16, wherein identifying the one or more individuals having the linked association with the at least one participant of the communication session comprises verifying the one or more individuals and the at least one participant are part of a common team or group.

Clause 22. The system according to Clause 16, comprising causing display of the query in a graphical user interface, the query comprising a plurality of user selectable responses.

Clause 23. A system, comprising: means to collect, via a communication session associated with a data transmission network, data shared between participants during the communication session, the shared data indicating the participants are seeking information on a topic covered in the communication session; means to generate a query based on the topic covered in the communication session, the query configured to invoke a recipient of the query to provide a response; means to identify one or more individuals, different from the participants, having knowledge that may be related to the topic covered in the communication session; means to transmit the generated query to data processing devices associated with the identified one or more individuals having knowledge that may be related to the topic covered in the communication session; means to receive, via the data transmission network, responses to the query from the data processing devices associated with the identified one or more individuals having knowledge that may be related to the topic covered in the communication session; means to compile a result based on the received responses; and means to cause display of a graphical user interface comprising the result.

Clause 24. The system according to Clause 23, comprising means to determine a consensus threshold is satisfied before generating the query based on the topic covered in the communication session.

Clause 25. The system according to Clause 23, wherein the consensus threshold is a participant threshold number, and determining the consensus threshold is satisfied comprises: analyzing the collected data to identify voice data or gesture data made by the participants to identify a number of the participants seeking information on the topic covered in the communication session, and confirming the number of the participants seeking information on the topic covered in the communication session is at least equal to or greater than the participant threshold number.

Clause 26. The system according to Clause 23, wherein identifying the one or more individuals having knowledge that may be related to the topic covered in the communication session comprises searching a database that is searchable for individuals based on subject matter expertise.

Clause 27. The system according to Clause 23, comprising means to cause display of the query in a graphical user interface on the data processing devices associated with the identified one or more individuals having knowledge that may be related to the topic covered in the communication session, the query comprising a plurality of user selectable responses.

Clause 28. The system according to Clause 23, comprising: means to analyze the result for identifying one or more individuals having knowledge related to the topic covered in the communication session; in response to identifying the one or more individuals, means to generate a follow-up query for the one or more individuals having knowledge related to the topic covered in the communication session; means to communicate the follow-up query to the one or more individuals having knowledge related to the topic covered in the communication session; means to compile a supplemental result based on responses to the follow-up query from the one or more individuals having knowledge related to the topic covered in the communication session; and means to cause display of a graphical user interface comprising the supplemental result.

Clause 29. A computer implemented method, comprising: collecting, by one or more data processing devices connected to a communication session via a data transmission network, data shared between participants during the communication session, the data shared via the one or more data processing devices; analyzing the collected data to identify a topic requiring consensus of the participants; generating a query based on the topic requiring consensus of the participants, the query configured to invoke a recipient of the query to provide a response; identifying one or more individuals, different from the participants, having a linked association with at least one participant of the communication session; retrieving information necessary to establish communications with the identified one or more individuals; transmitting the generated query to data processing devices associated with the participants and to data processing devices associated with the identified one or more individuals of an external communication session according to the retrieved information; receiving, via the data transmission network, responses to the query from the data processing devices associated with the participants and the identified one or more individuals; compiling a result based on the received responses; and causing display of a graphical user interface comprising the result.

Clause 30. The computer implemented method according to Clause 29, comprising: analyzing the result for determining a decision when the result indicates a threshold level of agreement of the participants and the one or more individuals; in response to determining the decision, generating a follow-up query related to a sub-topic to the topic; communicating the follow-up query to the participants and the one or more individuals; obtaining a supplemental result from the participants and the one or more individuals; and causing display of a graphical user interface comprising the supplemental result.

Clause 31. The computer implemented method according to Clause 29, wherein analyzing the collected data to identify the topic requiring consensus of the participants includes determining a consensus threshold is satisfied before generating the query based on the topic requiring consensus of the participants.

Clause 32. The computer implemented method according to Clause 31, wherein the consensus threshold is a participant threshold number, and determining the consensus threshold is satisfied comprises: analyzing the collected data to identify voice data or gesture data made by the participants to identify a number of the participants contributing to the topic requiring consensus, and confirming the number of the participants contributing to the topic requiring consensus is at least equal to or greater than the participant threshold number.

Clause 33. The computer implemented method according to Clause 29, wherein the external communication session is a communication channel, the communication channel providing a graphical user interface allowing individuals linked to the communication channel to communicate using text based chat or voice based chat.

Clause 34. The computer implemented method according to Clause 29, wherein identifying the one or more individuals having the linked association with the at least one participant of the communication session comprises verifying the one or more individuals and the at least one participant are part of a common team or group.

Clause 35. The computer implemented method according to Clause 29, comprising causing display of the query in a graphical user interface, the query comprising a plurality of user selectable responses.

Clause 36. A system, comprising: one or more data processing devices; and a computer-readable medium having encoded thereon computer-executable instructions to cause the one or more data processing devices to: collect, by the one or more data processing devices connected to a communication session via a data transmission network, data shared between participants during the communication session, the data shared via the one or more data processing devices; analyze the collected data to identify a topic requiring consensus of the participants; generate a query based on the topic requiring consensus of the participants, the query configured to invoke a recipient of the query to provide a response; identify one or more individuals, different from the participants, having a linked association with at least one participant of the communication session; retrieve information necessary to establish communications with the identified one or more individuals; transmit the generated query to data processing devices associated with the participants and to data processing devices associated with the identified one or more individuals of an external communication session according to the retrieved information; receive, via the data transmission network, responses to the query from the data processing devices associated with the participants and the identified one or more individuals; compile a result based on the received responses; and cause display of a graphical user interface comprising the result.

Clause 37. The system according to Clause 36, wherein the instructions further cause the one or more data processing devices to: analyze the result for determining a decision when the result indicates a threshold level of agreement of the participants and the one or more individuals; in response to determining the decision, generate a follow-up query related to a sub-topic to the topic; communicate the follow-up query to the participants and the one or more individuals; obtain a supplemental result from the participants and the one or more individuals; and cause display of a graphical user interface comprising the supplemental result.

Clause 38. The system according to Clause 36, wherein analyzing the collected data to identify the topic requiring consensus of the participants includes determining a consensus threshold is satisfied before generating the query based on the topic requiring consensus of the participants.

Clause 39. The system according to Clause 38, wherein the consensus threshold is a participant threshold number, and determining the consensus threshold is satisfied comprises: analyzing the collected data to identify voice data or gesture data made by the participants to identify a number of the participants contributing to the topic requiring consensus, and confirming the number of the participants contributing to the topic requiring consensus is at least equal to or greater than the participant threshold number.

Clause 40. The system according to Clause 36, wherein the external communication session is a communication channel, the communication channel providing a graphical user interface allowing individuals linked to the communication channel to communicate using text based chat or voice based chat.

Clause 41. The system according to Clause 36, wherein identifying the one or more individuals having the linked association with the at least one participant of the communication session comprises verifying the one or more individuals and the at least one participant are part of a common team or group.

Clause 42. The system according to Clause 36, comprising causing display of the query in a graphical user interface, the query comprising a plurality of user selectable responses.

Clause 43. A system, comprising: means to collect, via a communication session associated with a data transmission network, data shared between participants during the communication session, the data shared via data processing devices associated with the participants; means to analyze the collected data to identify a topic requiring consensus of the participants; means to generate a query based on the topic requiring consensus of the participants, the query configured to invoke a recipient of the query to provide a response; means to identify one or more individuals, different from the participants, having a linked association with at least one participant of the communication session; means to retrieve information necessary to establish communications with the identified one or more individuals; means to transmit the generated query to the data processing devices associated with the participants and to the data processing devices associated with the identified one or more individuals of an external communication session according to the retrieved information; means to receive, via the data transmission network, responses to the query from the data processing devices associated with the participants and the identified one or more individuals; means to compile a result based on the received responses; and means to cause a display of a graphical user interface comprising the result.

Clause 44. The system according to Clause 43, comprising: means to analyze the result for determining a decision when the result indicates a threshold level of agreement of the participants and the one or more individuals; means to generate a follow-up query related to a sub-topic to the topic, generating the follow-up query related to a subtopic in response to determining the decision; means to communicate the follow-up query to the participants and the one or more individuals; means to obtain a supplemental result from the participants and the one or more individuals; and means to cause display of a graphical user interface comprising the supplemental result.

Clause 45. The system according to Clause 43, wherein analyzing the collected data to identify the topic requiring consensus of the participants includes determining a consensus threshold is satisfied before generating the query based on the topic requiring consensus of the participants.

Clause 46. The system according to Clause 45, wherein the consensus threshold is a participant threshold number, and determining the consensus threshold is satisfied comprises: analyzing the collected data to identify voice data or gesture data made by the participants to identify a number of the participants contributing to the topic requiring consensus, and confirming the number of the participants contributing to the topic requiring consensus is at least equal to or greater than the participant threshold number.

Clause 47. The system according to Clause 43, wherein the external communication session is a communication channel, the communication channel providing a graphical user interface allowing individuals linked to the communication channel to communicate using text based chat or voice based chat.

Clause 48. The system according to Clause 43, wherein identifying the one or more individuals having the linked association with the at least one participant of the communication session comprises verifying the one or more individuals and the at least one participant are part of a common team or group.

Clause 49. The system according to Clause 43, comprising means to cause display of the query in a graphical user interface, the query comprising a plurality of user selectable responses.

Although the techniques have been described in language specific to structural features and/or methodological acts, it is to be understood that the appended claims are not necessarily limited to the features or acts described. Rather, the features and acts are described as example implementations of such techniques.

As discussed, from time to time, it may be difficult for participants to come to a consensus on various topics presented during a meeting. To make joint decisions, participants are often required to perform a number of manual tasks, e.g., gather supplemental information, make phone calls, send additional emails, communicate with teammates who may not be in attendance, etc., while the meeting is ongoing. Such tasks may lead to unwanted delay or missed opportunities, particularly when time-sensitive scenarios are presented. Furthermore, scenarios may arise in which participants in a meeting express the need to seek assistance or expertise on various topics that arose during the meeting. Such issues are exacerbated when individuals have to make group decisions afterward based on a recording of a meeting that took place previously. For example, the review or analysis of a recorded meeting may consume considerable time. Implementations of the automated computerized agent or bot provide a technical solution to the foregoing technical problem(s) associated with participants seeking consensus and/or technical expertise related to a discussed topic. Specifically, as part of the technical effect of the described implementations, the automated computerized agent or bot enhances computers and computerized technologies such that such enhanced computers and computerized technologies enable participants and individuals to quickly come to a consensus on a discussed topic and/or identify individuals with expertise related to a discussed topic.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a devices and systems may be improved as the use of the techniques disclosed herein enable users and individuals to quickly reach a consensus using unique graphical user interfaces overseen by one or more computerized agents or bots. In addition, the exemplary graphical user interfaces that implement the disclosed one or more computerized agents or bots greatly reduce the time needed to reach consensus or the duration required to identify one or more individuals with technical expertise related to topics discussed by individuals associated with the exemplary graphical user interfaces and communication sessions. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer implemented method, comprising:
    collecting, by one or more data processing devices connected to a communication session via a data transmission network, data shared between participants during the communication session, the data shared via the one or more data processing devices, the shared data indicating the participants are seeking information on a topic covered in the communication session;
    determining a consensus threshold is satisfied, the consensus threshold comprising a participant threshold number used to determine that at least a minimum plurality of the participants is seeking information on the topic covered in the communication session;
    in response to determining the consensus threshold is satisfied, generating a query based on the topic covered in the communication session, the query configured to invoke a recipient of the query to provide a response;
    identifying one or more individuals, different from the participants, having knowledge that may be related to the topic covered in the communication session;
    transmitting the generated query to data processing devices associated with the identified one or more individuals having knowledge that may be related to the topic covered in the communication session;
    receiving, via the data transmission network, responses to the query from the data processing devices associated with the identified one or more individuals having knowledge that may be related to the topic covered in the communication session;
    compiling a result based on the received responses; and
    causing display of a graphical user interface comprising the result.

2. The computer implemented method according to claim 1, wherein determining the consensus threshold is satisfied comprises:
    analyzing the collected data to identify voice data or gesture data made by the participants to identify a number of the participants seeking information on the topic covered in the communication session, and
    confirming the number of the participants seeking information on the topic covered in the communication session is at least equal to or greater than the participant threshold number.

3. The computer implemented method according to claim 1, wherein identifying the one or more individuals having knowledge that may be related to the topic covered in the communication session comprises searching a database that is searchable for individuals based on subject matter expertise.

4. The computer implemented method according to claim 1, comprising causing display of the query in a graphical user interface on the data processing devices associated with the identified one or more individuals having knowledge that may be related to the topic covered in the communication session, the query comprising a plurality of user selectable responses.

5. The computer implemented method according to claim 1, comprising:
    analyzing the result for identifying one or more individuals having knowledge related to the topic covered in the communication session;
    in response to identifying the one or more individuals, generating a follow-up query for the one or more individuals having knowledge related to the topic covered in the communication session;
    communicating the follow-up query to the one or more individuals having knowledge related to the topic covered in the communication session;
    compiling a supplemental result based on responses to the follow-up query from the one or more individuals having knowledge related to the topic covered in the communication session; and
    causing display of a graphical user interface comprising the supplemental result.

6. The computer implemented method according to claim 1, further comprising recognizing the topic by parsing voice of at least a plurality of the participants to identify the plurality of the participants are seeking the information related to the discussed topic.

7. The computer implemented method according to claim 1, wherein generating the query includes deriving the query from similar or same questions posed by a plurality of the participants seeking information on the topic covered in the communication session.

8. A computer implemented method, comprising:
collecting, by one or more data processing devices connected to a communication session via a data transmission network, data shared between participants during the communication session, the data shared via the one or more data processing devices, the shared data indicating the participants are seeking consensus on a topic covered in the communication session;
determining a consensus threshold is satisfied, the consensus threshold comprising a participant threshold number used to determine that at least a minimum plurality of the participants is seeking information on the topic covered in the communication session;
in response to determining the consensus threshold is satisfied, generating a query based on the topic covered in the communication session, the query configured to invoke a recipient of the query to provide a response;
identifying one or more individuals, different from the participants, having a linked association with at least one participant of the communication session;
transmitting the generated query to data processing devices associated with the participants and to data processing devices associated with the identified one or more individuals of an external communication session;
receiving, via the data transmission network, responses to the query from the data processing devices associated with the participants and the identified one or more individuals;
compiling a result based on the received responses; and
causing display of a graphical user interface comprising the result.

9. The computer implemented method according to claim 8, comprising:
analyzing the result for determining a decision when the result indicates a threshold level of agreement of the participants and the one or more individuals;
in response to determining the decision, generating a follow-up query related to a sub-topic to the topic;
communicating the follow-up query to the participants and the one or more individuals;
compiling a supplemental result based on responses to the follow-up query from the participants and the one or more individuals; and
causing display of a graphical user interface comprising the supplemental result.

10. The computer implemented method according to claim 8, wherein determining the consensus threshold is satisfied comprises:
analyzing the collected data to identify voice data or gesture data made by the participants to identify a number of the participants contributing to the topic covered in the communication session, and
confirming the number of the participants contributing to the topic covered in the communication session is at least equal to or greater than the participant threshold number.

11. The computer implemented method according to claim 8, wherein the external communication session is a communication channel, the communication channel providing a graphical user interface allowing individuals linked to the communication channel to communicate using text based chat or voice based chat.

12. The computer implemented method according to claim 8, wherein identifying the one or more individuals having the linked association with the at least one participant of the communication session comprises verifying the one or more individuals and the at least one participant are part of a common team or group.

13. The computer implemented method according to claim 8, comprising causing display of the query in a graphical user interface, the query comprising a plurality of user selectable responses.

14. A system, comprising:
one or more data processing devices; and
a non-transitory computer-readable medium having encoded thereon computer-executable instructions to cause the one or more data processing devices to:
collect, by the one or more data processing devices connected to a communication session via a data transmission network, data shared between participants during the communication session, the data shared via the one or more data processing devices, the shared data indicating the participants are seeking consensus on a topic covered in the communication session;
determine a consensus threshold is satisfied, the consensus threshold comprising a participant threshold number used to determine that at least a minimum plurality of the participants is seeking information on the topic covered in the communication session;
in response to determining the consensus threshold is satisfied, generate a query based on the topic covered in the communication session, the query configured to invoke a recipient of the query to provide a response;
identify one or more individuals, different from the participants, having a linked association with at least one participant of the communication session;
transmit the generated query to data processing devices associated with the participants and to data processing devices associated with the identified one or more individuals of an external communication session;
receive, via the data transmission network, responses to the query from the data processing devices associated with the participants and the identified one or more individuals;
compile a result based on the received responses; and
cause display of a graphical user interface comprising the result.

15. The system according to claim 14, wherein the instructions further cause the one or more data processing devices to:
analyze the result for determining a decision when the result indicates a threshold level of agreement of the participants and the one or more individuals;
in response to determining the decision, generate a follow-up query related to a sub-topic to the topic;
communicate the follow-up query to the participants and the one or more individuals;
compile a supplemental result based on responses to the follow-up query from the participants and the one or more individuals; and
cause display of a graphical user interface comprising the supplemental result.

16. The system according to claim 14, wherein determining the consensus threshold is satisfied comprises:
   analyzing the collected data to identify voice data or gesture data made by the participants to identify a number of the participants contributing to the topic covered in the communication session, and
   confirming the number of the participants contributing to the topic covered in the communication session is at least equal to or greater than the participant threshold number.

17. The system according to claim 14, wherein the external communication session is a communication channel, the communication channel providing a graphical user interface allowing individuals linked to the communication channel to communicate using text based chat or voice based chat.

18. The system according to claim 14, wherein identifying the one or more individuals having the linked association with the at least one participant of the communication session comprises verifying the one or more individuals and the at least one participant are part of a common team or group.

19. The system according to claim 14, comprising causing display of the query in a graphical user interface, the query comprising a plurality of user selectable responses.

20. A system, comprising:
   means to collect, via a communication session associated with a data transmission network, data shared between participants during the communication session, the shared data indicating the participants are seeking information on a topic covered in the communication session;
   means to determine a consensus threshold is satisfied, the consensus threshold comprising a participant threshold number used to determine that at least a minimum plurality of the participants is seeking information on the topic covered in the communication session;
   means to generate a query based on the topic covered in the communication session, the query configured to invoke a recipient of the query to provide a response and the query generated in response to determining the consensus threshold is satisfied;
   means to identify one or more individuals, different from the participants, having knowledge that may be related to the topic covered in the communication session;
   means to transmit the generated query to data processing devices associated with the identified one or more individuals having knowledge that may be related to the topic covered in the communication session;
   means to receive, via the data transmission network, responses to the query from the data processing devices associated with the identified one or more individuals having knowledge that may be related to the topic covered in the communication session;
   means to compile a result based on the received responses; and
   means to cause display of a graphical user interface comprising the result.

21. The system according to claim 20, wherein determining the consensus threshold is satisfied comprises:
   analyzing the collected data to identify voice data or gesture data made by the participants to identify a number of the participants seeking information on the topic covered in the communication session, and
   confirming the number of the participants seeking information on the topic covered in the communication session is at least equal to or greater than the participant threshold number.

22. The system according to claim 20, wherein identifying the one or more individuals having knowledge that may be related to the topic covered in the communication session comprises searching a database that is searchable for individuals based on subject matter expertise.

23. The system according to claim 20, comprising means to cause display of the query in a graphical user interface on the data processing devices associated with the identified one or more individuals having knowledge that may be related to the topic covered in the communication session, the query comprising a plurality of user selectable responses.

24. The system according to claim 20, comprising:
   means to analyze the result for identifying one or more individuals having knowledge related to the topic covered in the communication session;
   in response to identifying the one or more individuals, means to generate a follow-up query for the one or more individuals having knowledge related to the topic covered in the communication session;
   means to communicate the follow-up query to the one or more individuals having knowledge related to the topic covered in the communication session;
   means to compile a supplemental result based on responses to the follow-up query from the one or more individuals having knowledge related to the topic covered in the communication session; and
   means to cause display of a graphical user interface comprising the supplemental result.

\* \* \* \* \*